United States Patent
Rush et al.

(10) Patent No.: US 10,110,385 B1
(45) Date of Patent: Oct. 23, 2018

(54) DURESS SIGNATURES

(71) Applicant: Amazon Technologies, Inc., Seattle, WA (US)

(72) Inventors: Dylan Harris Rush, Seattle, WA (US); Darren Ernest Canavor, Redmond, WA (US); Daniel Wade Hitchcock, Bothell, WA (US); Jesper Mikael Johansson, Redmond, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 14/580,118

(22) Filed: Dec. 22, 2014

(51) Int. Cl.
  *H04L 9/32* (2006.01)
(52) U.S. Cl.
  CPC .................................. *H04L 9/3247* (2013.01)
(58) Field of Classification Search
  CPC ......... H04L 9/3247; G06F 21/00; G06F 12/14
  See application file for complete search history.

(56) References Cited

U.S. PATENT DOCUMENTS

| | | |
|---|---|---|
| 4,868,750 A | 9/1989 | Kucera et al. |
| 5,062,047 A | 10/1991 | Tanaka |
| 5,668,928 A | 9/1997 | Groner |
| 5,946,648 A | 8/1999 | Halstead, Jr. et al. |
| 7,036,075 B2 | 4/2006 | Walker |
| 8,972,445 B2 | 3/2015 | Gorman |
| 9,606,983 B1 | 3/2017 | McClintock et al. |
| 9,819,673 B1 | 11/2017 | Johansson et al. |
| 2003/0182555 A1* | 9/2003 | Labaton ............... H04L 63/0442 713/176 |
| 2003/0204392 A1 | 10/2003 | Finnigan |
| 2004/0230891 A1* | 11/2004 | Pravetz ............... G06F 21/6218 715/229 |
| 2005/0005266 A1 | 1/2005 | Datig |
| 2005/0015600 A1* | 1/2005 | Miyazaki ................ G06F 21/64 713/176 |
| 2006/0075228 A1 | 4/2006 | Black et al. |

(Continued)

OTHER PUBLICATIONS

McClintock, J. A., et al., "Human Readable Mechanism for Communicating Binary Data," U.S. Appl. No. 14/470,886, filed Aug. 27, 2014.

(Continued)

*Primary Examiner* — Ellen Tran
(74) *Attorney, Agent, or Firm* — Davis Wright Tremaine LLP

(57) ABSTRACT

A system and method for generating a signature for a document using credentials indicating an unsanctioned signing event. The system and method includes receiving a request to generate a signature of a signatory for a document, wherein the request includes a received set of credential data for a signatory, obtaining a token identifier for at least one computing device, and determining if the received set of credential data matches credentials indicating the unsanctioned signing event. The system and method further includes receiving the signature of the signatory, the document identifier, and the token identifier, and determining based at least in part on the signature, document identifier, and the token identifier, whether the received signature is associated with the unsanctioned signing event.

20 Claims, 15 Drawing Sheets

(56) References Cited

U.S. PATENT DOCUMENTS

| | | | |
|---|---|---|---|
| 2007/0015490 A1* | 1/2007 | Munje | H04M 1/66 455/410 |
| 2007/0100863 A1 | 5/2007 | Shardanand | |
| 2007/0250920 A1* | 10/2007 | Lindsay | G06F 21/31 726/7 |
| 2009/0132813 A1* | 5/2009 | Schibuk | G06Q 20/223 713/158 |
| 2010/0082333 A1 | 4/2010 | Al-Shammari | |
| 2010/0131366 A1 | 5/2010 | Gibson et al. | |
| 2010/0185496 A1 | 7/2010 | Hahn et al. | |
| 2012/0089410 A1 | 4/2012 | Mikurak | |
| 2013/0013921 A1 | 1/2013 | Bhathena et al. | |
| 2013/0086642 A1* | 4/2013 | Resch | H04L 9/085 726/4 |
| 2014/0032584 A1 | 1/2014 | Baker et al. | |
| 2014/0040312 A1 | 2/2014 | Gorman | |
| 2014/0173274 A1 | 6/2014 | Chen et al. | |
| 2014/0359722 A1* | 12/2014 | Schultz | H04L 9/3231 726/5 |
| 2014/0372752 A1 | 12/2014 | Sallis | |
| 2017/0199868 A1 | 7/2017 | McClintock et al. | |
| 2018/0048640 A1 | 2/2018 | Johansson et al. | |

OTHER PUBLICATIONS

"Print formatted data to stdout," © 2000-2015 cplusplus.com, <http://www.cplusplus.com/reference/cstdio/printf/> [retreived Jun. 3, 2015], 2 pages.

"Printf Format String," Wikipedia, the Free Encyclopedia, May 28, 2015, <http://en.wikipedia.org/wiki/Printf_format_string> [retreived Jul. 28, 2016], 6 pages.

"Information technology—Trusted Platform Module—Part 1: Overview," International Organization for Standardization/International Electrotechnical Commission ISO/IEC 11889-1:2009(E), May 15, 2009, 20 pages.

"Information technology—Trusted Platform Module—Part 2: Design Principles," International Organization for Standardization/International Electrotechnical Commission ISO/IEC 11889-2:2009(E), May 15, 2009, 152 pages.

"Information technology—Trusted Platform Module—Part 3: Structures," International Organization for Standardization/International Electrotechnical Commission ISO/IEC 11889-3:2009(E), May 15, 2009, 204 pages.

"Information technology—Trusted Platform Module—Part 4: Commands," International Organization for Standardization/International Electrotechnical Commission ISO/IEC 11889-4:2009(E), May 15, 2009, 254 pages.

"TPM Main: Part 1 Design Principles—Specification Version 1.2—Level 2 Revision 103," Trusted Computing Group, Inc., Jul. 9, 2007, 182 pages.

"TPM Main: Part 2 TPM Structures—Specification Version 1.2—Level 2 Revision 103," Trusted Computing Group, Inc., Jul. 9, 2007, 198 pages.

"TPM Main: Part 3 Commands—Specification Version 1.2—Level 2 Revision 103," Trusted Computing Group, Inc., Jul. 9, 2007, 330 pages.

"TPM Main: Part 1 Design Principles—Specification Version 1.2—Revision 116," Trusted Computing Group, Inc., Mar. 1, 2011, 184 pages.

"TPM Main: Part 2 TPM Structures—Specification Version 1.2—Revision 116," Trusted Computing Group, Inc., Mar. 1, 2011, 201 pages.

"TPM Main: Part 3 Commands—Specification Version 1.2—Revision 116," Trusted Computing Group, Inc., Mar. 1, 2011, 339 pages.

Eriksson, "A study of Bitcoin as a currency for email-based microtransactions," Final Thesis, Linköpings universitet Institutionen för datavetenskap (Linköping University Department of Computer and Information Science), Dec. 18, 2015, 43 pages.

Toews, "Two-factor Authentication," Github, Sep. 3, 2013 [retrieved Jul. 14, 2017], https://github.com/blog/1614-two-factor-authentication, 4 pages.

* cited by examiner

US 10,110,385 B1

DURESS SIGNATURES

BACKGROUND

Many documents, such as contracts, applications, receipts, and invoices, are executed by one or more parties physically signing a document using a writing implement. However, such physical signatures are susceptible to forgery and alteration. Furthermore, original documents are also at risk of being lost or misplaced, making later validation of the signatures and the signed documents difficult. Additionally, it can be difficult, if not impossible, to determine and/or prove whether the document was signed by the signatory under duress from the signature alone.

BRIEF DESCRIPTION OF THE DRAWINGS

Various embodiments in accordance with the present disclosure will be described with reference to the drawings, in which.

DETAILED DESCRIPTION

Figure 1:
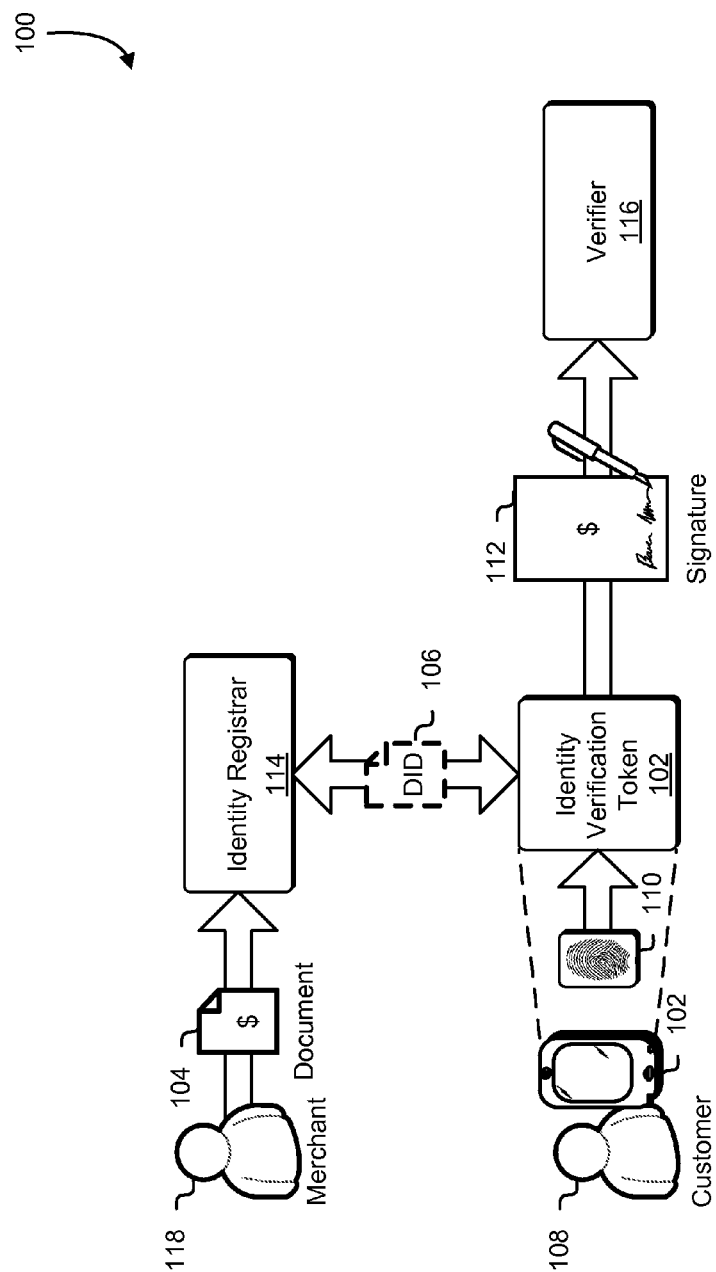
FIG. 1 illustrates an example of signing a document in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for an identity verification token for signing physical and digital documents. Some embodiments employ techniques for generating a document identifier for a document and providing that document identifier to the identity verification token. In some embodiments, the document identifier is derived from the document contents or other unique characteristics of the document. In some of these embodiments, the document is provided to an identity registrar, which derives the document identifier and provides it to the identity verification token. In other embodiments, the identity verification token generates the document, such as by performing an optical recognition scan of the document and generating a cryptographic hash of the contents. The identity verification token may be a device or software application that has been registered with the identity registrar and is authorized by the identity registrar to generate document signatures.

To sign the document, a signatory (e.g., a user of the identity verification token) may log in to the identity verification token using his/her credentials. The signatory may also be registered with the identity registrar and may have a signatory identifier, unique to the signatory, that was assigned to the signatory upon registration. Signing in with the credentials provides some proof that the signatory was present at the signing of the document. Upon signing in with the credentials, the identity verification token may generate the signature by using, at least, the document identifier, the credentials or some value indicating that the credentials were entered (e.g., a hash of the credentials), and an identity verification token number (or identity verification identifier), which may be an identifier that uniquely identifies the identity verification token to the identity registrar. The signature may be generated by passing at least these values to an algorithm, such as a cryptographic hash algorithm. Once the signature is generated, the signature may be provided to the identity registrar for storage. In some implementations, a timestamp indicating a time that the signature event occurred may be provided with the signature to the identity registrar. Subsequently, various details of the signing may be verified, such as whether a user was a party to the signing, when the document was signed, whether a signature is a valid signature.

The described and suggested techniques improve the field of computing, and specifically the field of signature execution and authentication, by providing a more secure system for signing physical documents and other objects. Additionally, the described and suggested techniques improve the functioning of computer systems by allowing a user to sign approval of transactions and other signing events by entering credentials into a device, such as a smartphone, that has been registered to act as an identity verification token. Moreover, the described and suggested techniques offer meaningful advantages over general digital signatures by providing for duress signatures, whereby a signatory can signal his/her lack of consent to the signing without revealing this lack of consent to observing parties.

FIG. 1 illustrates an aspect of an environment 100 in which an embodiment may be practiced. As illustrated in FIG. 1, the environment 100 may include a customer 108 generating a signature 112 for a document 104 using an identity verification token 102 and credentials 110 of the customer 108. The signature 112 may be stored by the identity registrar 114 and verified by a verifier 116 at a later date. In some implementations, the identity registrar 114 may not store signatures, but may instead store the parameters, such as the identity verification token number, the credentials 110, and document identifier 106 used to generate the signature 112 such that the identity registrar 114, when requested to verify the signature, can re-generate a copy of the signature to determine if it matches the signature requested to verify.

The identity verification token 102 may be an item used by a user, such as the customer 108, to perform the signing (i.e., generate the signature). The identity verification token 102, in some embodiments, is embodied as a physical device, such as a mobile phone, tablet computing device, laptop computer, electronic key fob, or other physical device, such as the electronic client device 1502 described in conjunction with FIG. 15. The identity verification token 102 may have a password input mechanism, such as a keypad, number pad, fingerprint scanner, or gesture recognition component.

The identity verification token 102 may be such a device containing a Trusted Platform Module (TPM) such that Trusted Platform Module hardware may be utilized to securely provide credential verification without revealing passwords or cryptographic keys. Alternatively, in some embodiments the identity verification token 102 is implemented in software, such as in an application on a mobile device or in an operating system of the mobile device or other computing device. In some of these embodiments, the software runs in a hardware-secured execution environment, such as a Trusted Platform Module or Intel Software Guard eXtensions environment. In still other embodiments, the identity verification token 102 comprises an algorithm implemented on a computing device that may generate a cryptographic hash of applicable input values (e.g., password, biometric data, private cryptographic key, etc.).

The system of the present disclosure may be used to digitally sign a variety of documents. Examples of such documents include purchase receipts, mortgage loan applications, and credit card applications. Alternatively or additionally, the system of the present disclosure may be used to digitally sign digital documents, such as, for example, to authenticate a credit card purchase at an electronic checkout station in a grocery store. In the latter case, the identity verification token 102 may communicate through a near field communication (NFC) network with the electronic checkout station to verify the purchase.

In addition to NFC, other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, the devices may utilize short-range, low-power and high-frequency radio transmissions, such as Bluetooth®. In still other embodiments, the devices may support acoustic-based data transfer. For example, one device may include software components and a speaker that enable the device to broadcast data to another device as sound waves, while the other device may include software components and microphone that enable the second mobile device to receive the data embedded in the sound waves. Thus, one or more of radio signal-based data transfer (e.g., NFC, Wi-Fi Direct, or Bluetooth®), light-based data transfer (e.g., infrared data transfer or capturing an image of a document (e.g., with a QR code on it)), an acoustic-based data transfer (e.g., sound wave-embedded data), or magnetic field-based transfer (e.g., reading a code from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

In the environment 100, the item being signed is depicted as the document 104. However, the present disclosure contemplates that the item being signed need not be a document (in some examples also referred to as a "record"), but may be any identifiable object. That is, the document 104 is contemplated to represent any object, physical, digital, or virtual, where a signature or authentication from a user, such as the customer 108, may be sought. For example, the document may be a software license agreement (also known as an end-user license agreement) and the identity verification token 102 may provide a signature to an electronic interface displaying the software license agreement to indicate a user's acceptance of the agreement. Similarly the document 104 may be a login screen, such as to an online website. As another example, the document 104 may be a physical object, such as an article of memorabilia (e.g., a football helmet, a lock of hair, twenty-seven 8×10 color glossy pictures, etc.), and a celebrity may use the identity verification token 102 to sign indicating that the celebrity was, in fact, a prior owner of the memorabilia.

The document 104 may have a corresponding identifier, referred to as document identifier 106 (or DID). The document identifier 106 may be presented to the identity verification token 102 in a variety of ways, including wirelessly (e.g., through a Wi-Fi network connection) or attached to the document 104 in a manner readable by the identity verification token 102, such as an optically scannable printed number, bar code, or quick response (QR) code. In some cases, the document identifier 106 may be rooted in a radio frequency identification (RFID) tag attached to the document 104. The document identifier 106 may be an identifier that uniquely identifies the document 104.

In various embodiments, the document identifier 106 is a number, hash, globally unique identifier (GUID), serial number, or other series of characters assigned to the document 104 by the identity registrar 114 to correspond to the particular document 104. In other embodiments, the document identifier 106 is generated from information intrinsic to the document 104, such as the optically recognized content of the document 104. For example, a hash of the document 104 contents may be generated as the document identifier 106 for the document. In another example, the document identifier 106 may be a number that is automatically incremented by the identity registrar 114 upon a request to generate an identifier for the document 104. As another example, a digest of the document may be provided to the identity registrar 114, which may then generate the document identifier 106 by hashing the digest with a seed known or generated by the identity registrar 114. The digest may be hashed with a seed, or may be generated in some other way, so as to ensure that each document identifier 106 is unique such that hash collisions may be avoided. As yet another example, the document identifier 106 may be a number stochastically determined by the identity registrar 114, but in such a way that no identifiers are ever repeated. In some examples, "hash," may refer to a cryptographically strong hash; meaning that it is computationally infeasible to decrypt and/or forge, and of negligible probability that two distinct values can be computed or found such that the hash of one distinct value may equal a hash of another distinct value. In some examples, a "digest" may refer to a hash value produced from passing data (i.e., a message) through a cryptographic hash function.

In some embodiments, the document identifier 106 is generated by the identity registrar 114 for the document 104. In such embodiments, the document identifier 106 is pre-generated by submitting the document 104 to the identity registrar 114 for generation of the document identifier 106. In other embodiments, the document identifier 106 is generated on the fly. In some embodiments, the identity registrar 114 may store, in a data store, a timestamp indicating the time that the document identifier 106 was generated. In some of these embodiments, the document identifier 106 may be configured to expire (e.g., storing an expiration date, time to live, etc. in the data store of the identity registrar 114) after a certain date or amount of time. For example, the customer 108 may be presented with the document 104 by a merchant 118. In such an example, the customer 108 may scan the document 104 or capture an image of the document 104 using one or more sensors of the identity verification token 102. In some of these embodiments, the identity verification token 102 submits, such as through a Wi-Fi network connection, the captured image or contents of the document 104 obtained by the identity verification token 102 via optical character recognition functionality to the identity registrar 114. In response, the identity registrar 114 may provide the identity verification token 102 with the document identifier 106 of the document 104.

Alternatively, in some of these embodiments, the identity verification token 102 generates the document identifier 106 itself, such as by hashing the contents or image of the document 104 obtained via one or more sensors of the identity verification token 102. In these cases, this hash may operate as the document identifier 106, and upon generating the signature 112, the signature 112, the document identifier 106, and, in some cases, the scanned contents or image of the document 104. In others of these cases, the identity verification token 102 the hash result of hashing the image of the document 104 or the optical character recognized contents of the document 104 may be used as a "pre-document identifier." In such a case, the pre-document identifier, the image or contents of the document 104, and a "pre-signature" generated based on the pre-document identifier may be provided to the identity registrar 114. The identity registrar 114 may record the document as having been signed and then generate the actual document identifier 106 and generate the actual signature 112. In this manner, the document identifier 106 need not be pre-generated before the signing and delays in waiting to receive the document identifier 106 from the identity registrar 114 may be avoided.

The customer 108 may provide credentials 110 sufficient to prove the identity of the customer 108 to the identity verification token 102. For example, as a component of a multi-factor authentication scheme, providing the credentials 110 may also serve to indicate the presence of customer 108 at the time of the signing. Examples of credentials 110 may include one or more of proof of what the customer 108 knows (e.g., passwords), who the customer 108 is (e.g., fingerprint patterns and other biometric data), something the customer 108 has (e.g., a code sent to a phone or other device of the customer as part of a multi-factor authentication scheme), or other data indicating presence of the customer 108 at the signing. The credentials 110 may be linked to an identifier that identifies the user, which may be referred to as a user identifier or signatory identifier. The credentials 110 may be generated by the identity registrar or selected by the customer 108 when the customer 108 applies for registration as a signatory with the identity registrar 114.

The identity registrar 114 may record the credentials 110 or proof of credentials in a data store. As needed or desired by the customer 108 or the identity registrar 114, the credentials 110 may be changed. For example, the customer 108 may request to change his/her password, request to reset his/her password, or request to use a fingerprint from a different finger or combinations of fingers than the previous credentials.

Likewise, additional data may be provided to or be available to the identity verification token 102, such as a timestamp indicating the time of the signing and global positioning data indicating the location of the signing. Such additional data may also be used in generating the signature 112 and/or be stored with the identity registrar 114 in association with the signing event. In some examples, a "timestamp" may refer to any valid measure of time at a precision as desired by the users or administrators of the system. An example of a timestamp could be a value reflecting a 64-bit datetime measured by the number of microseconds from Jan. 1, 1970 coordinated universal time or some other historical temporal reference point. Upon receipt of the digital signature, the identity registrar 114 may issue its own timestamp indicating the time of the signature event. In some verifications, the timestamp provided by the identity verification token 102 may be compared with the timestamp issued by the identity registrar to confirm that there is no suspect delay (e.g., greater than two minutes) between the timestamp of the identity verification token 102 and the timestamp of the identity registrar 114.

The credentials 110, the document identifier 106, an identifier (also referred to as a token identifier or identity verification token number) that identifies the identity verification token 102 may be used by the identity verification token 102 to generate the signature 112. As an example, the signature 112 may be a cryptographic hash of the provided data, such as may be produced by a cryptographic hash function like MD5, MD6, SHA-1, and SHA-2. In some embodiments, the signature 112 is generated in a secure execution environment, such as a Trusted Platform Module or Intel Software Guard eXtensions environment. In other embodiments, the signature 112 is generated via an application-specific integrated circuit designed to generate such signatures.

The signature 112 may be provided to an identity registrar 114 for later verification. The identity registrar 114 may be a third party entity or central registrar, such as a service provider that provides an authentication service, and may have one or more computer systems in a distributed computing environment able to receive signatures and/or receive and send messages to the identity verification token and the verifier 116. The identity registrar 114 may provide application programming interfaces to entities such as the verifier 116, the merchant 118, the customer 108, the identity verification token, and other entities. Such application programming interfaces may include interfaces for requesting that the identity registrar 114 generate the document identifier 106 for the document 104, verifying the document identifier 106, and verifying the document presented to the customer 108. Such application programming interfaces may also include interfaces for verifying the signature 112, the customer 108, the time the signature 112 was generated, and other interfaces. The verifier 116 may be any suitable hardware or software in communication with the identity registrar 114 configured to determine, among other things one or more of the validity of the signature 112, whether the document 104 was signed, who the document 104 was signed by, whether a user, such as the customer 108, was a party to signing the document 104, what identity verification tokens were used in signing the document 104, and what time the document 104 was signed. Note that, in some embodiments the functionality described concerning the verifier 116, and the verifiers in other figures of the present disclosure, may actually be performed by the identity registrar 114. However, in other embodiments, the functionality of the verifier 116 may be performed by an entity separate from the identity registrar 114 (e.g., a signature verification device of a merchant).

It is contemplated that users may change their passwords/credentials periodically. In such cases, the identity registrar 114 may also keep track of these changes by storing the proofs of the different credentials in the data store of the identity registrar 114. For example, proof of possession of credentials may include information sufficient to prove access to the credentials, such as a password, a cryptographic hash/digest of the password, cryptographic digital signature generated by a signing encryption key, or other secret key verifiable by the computing resource service provider for authorizing the identity of the requestor. In addition, the identity registrar 114 may store in the data store a corresponding timestamp, version number, or some other indicator indicating when the credential was generated/activated/stored. Similarly, over a course of time, a user may change or use multiple identity verification tokens, and in a similar manner the identity registrar 114 may store in the data store the different identity verification token numbers corresponding to the different identity verification tokens.

In some cases, submission of the document 104 to the identity registrar 114 to obtain the document identifier 106 is synchronous. For example, the merchant 118 may generate the document 104 as a receipt for a credit card transaction between the merchant 118 and the customer 108. The merchant 118 may transmit an electronic copy of the document 104 to the identity registrar 114, which, in turn, may respond with the document identifier 106 for the document.

Similarly, communication between the identity verification token 102 and the identity registrar 114 may be synchronous. For example, the identity verification token 102 may receive the document identifier 106 (e.g., input by the customer 108, optically scanned from a quick response code by the identity verification token 102, received through a wireless network from the identity registrar 114 or electronic device of the merchant 118, etc.), and may then request an electronic copy of the document 104 corresponding to the document identifier 106. In response, the identity registrar 114 may provide an electronic copy of the document to the identity verification token 102. In this manner, the customer 108 may be able to verify, such as by viewing the electronic copy on a display screen of the identity verification token, that the document 104 to which the customer 108 is signing has not been altered.

For example, if the merchant 118 has requested the document identifier 106 for an invoice of "$119.50," submitted as the document 104, from the identity registrar 114. In this example, the merchant 118 then alters the document 104 such that it reflects a different invoice amount of "$65," and presents the altered document and the document identifier 106 to the customer 108 to sign. As noted, in some embodiments, the identity registrar 114 stores and maintains public versions of submitted original documents. In such embodiments, the customer can scan or enter the document identifier 106 into the identity verification token 102 to request a visual copy (e.g., electronic copy, portable document format replica) of the document 104, and, upon receipt of the visual copy, the customer 108 will realize that the document 104 being signed for is not the document being presented. Additionally or alternatively, the customer 108 may be able to scan (e.g., with an image sensor or bar code reader) the altered document 104 using the identity verification token 102 and request confirmation from the identity registrar 114 of the document identifier 106 for the document in question. The identity registrar 114 may respond that a document identifier 106 for the altered document could not be found or the identity registrar 114 may respond with a different document identifier that does not match the document identifier 106. In either case, such responses may give notice to the customer 108 that the document 104 being signed is not the document presented. Note that, in some embodiments, signatures may match by being equal while, in other embodiments, equality is not required for a match. For instance, in some embodiments, a signature for a document may be based at least in part on a digital fingerprint of the document and/or other information (e.g., document ID, or other information, such as other information described herein as an input to a signature). The digital finger print may be generated using an algorithm that is robust to minor changes to the document so that, for instance, signatures can be compared and a metric placed on the signatures may be used to determine whether the signatures match (e.g., by being within some predefined threshold defined for the metric).

The signature 112 may also be provided to the identity registrar 114 synchronously (e.g., the signature 112 is sent as soon as it is generated). In some cases, the signature 112 may be printed, imprinted, scorched, etched, engraved, embossed or otherwise physically rendered onto the document 104 by the identity verification token 102. As one example, the identity verification token 102 may print the signature 112 as a cryptographic hash characters on a display screen and the customer 108 may write the signature 112 onto the document 104.

In some embodiments, the signature 112 may be displayed as a set of symbols, such as the symbols described in U.S. patent application Ser. No. 14/470,886 entitled "HUMAN READABLE MECHANISM FOR COMMUNICATING BINARY DATA", incorporated by reference, where each symbol may be represented by one or more words in a manner that can be more easily remembered by a human than non-semantic characters. For example, a signature may be comprised of a series of adjective-noun pairs, such as, "yellow-duck bad-dog green-pumpkin fast-watermelon."

Alternatively, as another example, the identity verification token 102 may include a printing mechanism that prints an optically scannable code, such as a quick response code, representing the signature 112 onto the document 104. In still another example, the signature may be displayed on a screen of the device 102 as a scannable code (e.g., quick response code, bar code, etc.), and the customer 108 may show the displayed scannable code to the merchant 118 who may then scan the signature 112 from the display screen of the device 102. As yet another example, the identity verification token 102 may print the signature 112 as cryptographic hash characters, as at optically scannable bar code, or as an optically scannable quick response code onto a strip of adhesive material which may be affixed to the document 104. As still another example, the identity verification token 102 may be a device having a laser engraver that engraves the signature 112 onto the surface of the object represented by the document 103.

The verifier 116 may be any hardware or software configured to verify the signature 112. To verify the signature 112, the verifier 116 may provide the signature 112, the document identifier 106, and, in some cases, the timestamp, to the identity registrar 114. In response, the identity registrar 114 may respond to the verifier 116 whether the customer 108 did indeed sign the document 104 corresponding to the document identifier 106 at the signing.

The entity represented by the merchant 118 need not necessarily be a merchant, but may be any party or entity providing a document for another party to the transaction, such as the customer 108, to sign. For example, the merchant 118 may be a bank, the document 104 may be a loan application, and the customer 108 may be an applicant for the loan. As another example, the merchant 118 may be a retail outlet, the document 104 may be a receipt for a credit card purchase, and the customer 108 may be purchasing an item from the retail outlet. As still another example, the merchant 118 may be a software company, the document 104 may be a software license agreement, and the customer 108 may be a user who is digitally signing having read the end user license agreement via an Internet-connected home computer, which is acting as the identity verification token 102. Similarly, the merchant 118 may be a retailer with a merchant beacon for providing product information to customers' electronic devices while the customers are shopping, and the customer 108 may be a customer who is signing to approve receiving such information.

Figure 2:
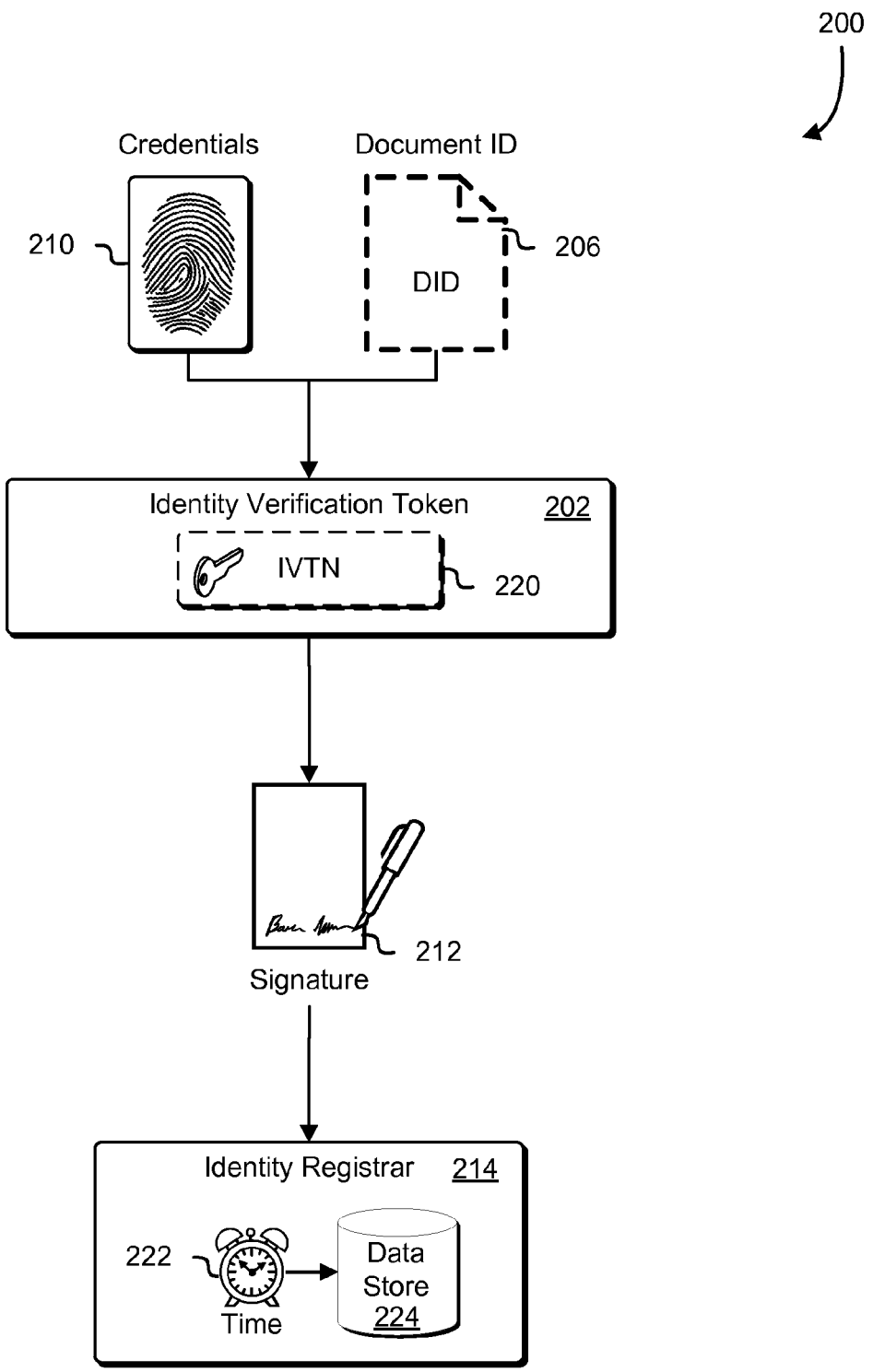
FIG. 2 illustrates an example of an identity verification token generating a signature for an identity registrar in accordance with an embodiment.

FIG. 2 illustrates an aspect of an environment 200 in which an embodiment may be practiced. Specifically, FIG. 2 depicts details of the customer 108 using the identity verification token 202 to generate a signature 212 for the document 104, which may then be provided to an identity registrar 214 to be stored in a data store 224 with a timestamp 222. The identity verification token 202 may obtain the document identifier 206 for the document 104, such as from the merchant 118, the identity registrar 214, or the customer 108, and the customer 108 may provide the proof of credentials to the identity verification token 202.

The identity verification token 202 may have an identifier, referred to a token ID or identity verification token number 220, that uniquely identifies the identity verification token 202 from other identification verification tokens. The identity verification token number 220 may be issued to and/or stored within the identity verification token 202. In a multi-factor authentication scheme, the identity verification token number 220 may represent what the customer 108 has (e.g., the identity verification token 202) at the time of the signing. In some embodiments, the identity verification token number 220 is stored in a hardware-secured processing space, such as in a Trusted Platform Module or via Intel Software Guard eXtensions space. Thus, the identity verification token number 220 may operate as a "shared secret" (shared with the identity registrar 214) to feed into the signature algorithm.

Note that the present disclosure is also contemplated to cover asymmetric cryptographic signatures. In such embodiments, the identity verification token number 220 may be a private key of a public-private key pair where the identity registrar 214 may have a corresponding public key. In these embodiments, the signature may be generated at least using the document identifier and the credentials 210 or proof of credentials, and encrypted using the identity verification token number 220. The identity registrar 214 may, upon receipt, decrypt the signature using the corresponding public key.

The identity verification token 202 may be registered with the identity registrar 214, and, as part of the registration, the identity registrar 214 may have knowledge of the identity verification token number 220. When the identity verification token 202 provides the signature 212, it may also include a digital signature for the identity verification token number 220, such as via a Trusted Platform Module of the identity verification token 202. The Trusted Platform Module may have a private key and the identity registrar 214 may have the public key, which may have been received when the identity verification token was registered with the identity registrar. In this manner, the identity registrar 214 can verify that the signature 212 was generated by a registered identity verification token 202 using a valid identity verification token number 220.

As noted, the signature 212 may be generated by hashing multiple factors, such as the credentials 210, the document identifier 206, and the identity verification token number 220. The signature 212 may be based a keyed-hash message authentication code (HMAC) using a cryptographic hash function like MD5, MD6, SHA-1, and SHA-2. For example, in one embodiment, the signature 212 may be generated as follows:

$$\text{Signed}(DID) = \text{Encrypt}_{Pvt}(H(DID))$$

$$\text{Signature} = \text{Signed}(DID) + \text{HMAC}_{H(Pwd+Salt)}(\text{Signed}(DID))$$

Where, DID represents the document identifier 206, Pvt represents the identity verification token number 220 where the identity verification token number 220 is a private key of a public-private key pair, Pwd represents a set of credential data (e.g., password, password+biometric data, etc.), and the Salt may be a random value generated by the identity registrar 214. Thus, in this embodiment, the document identifier 206 may be digitally-signed by the identity verification token 202 encrypting a hash of the document identifier 206 using the identity verification token number 220 as a key. The signature 212 may then be generated by concatenating the document identifier signature to a keyed-hash message authentication code of the digitally-signed document identifier and a salted hash of the credentials 210. This yields a signature 212 that may be verified by an identity registrar by (decrypting the digitally-signed document identifier using its corresponding public key of the public-private key pair and comparing the decrypted value with a hash of the document identifier 206.

The identity registrar 214 may store information in the data store 224 sufficient to verify signatures, including one or more of as proof of credentials 210 of the customer 108, the identity verification token number 220, the signature 212, the document identifier 206, the timestamp 222 of the signing, and the signatory identifier of the customer 108. Proof of credentials 210 may be any information sufficient to verify that the customer 108 has possession of the credentials 210, including a hash of the credentials 210 (e.g., password or biometric data) or the credentials 110. In some embodiments, the stored proof of the credentials 110 is a hash of the credentials with a salt. In some embodiments, the salt is a value known only to the identity registrar 114. In other embodiments, the salt corresponds to (e.g., be the same as or be derived from) a user identifier or an identity verification token number 120.

In some embodiments, for non-repudiation purposes, not all information needed to regenerate the signature is stored in the data store 224. In such embodiments, the missing elements needed to regenerate or otherwise verify the signature are provided when verification is needed. In an example scenario, the signatory may have a symmetric key (in some cases this symmetric key may be credential data, a hash of the credential data, or some other key identified with the signatory) and the identity verification token 202 may have a symmetric key (e.g., its identity verification token number 220). The identity verification token 202 may generate a "signing key" based on encrypting the signatory's symmetric key and an identity verification token timestamp (generated via an internal clock of the identity verification token 202) using the symmetric key of the identity verification token 202. The signature 212 may then be generated by encrypting the document identifier 206 using the signing key.

In this scenario, the signature 212, the document identifier 206, identity verification token timestamp, and the signing key may be provided to the identity registrar 214 for storage in the data store 224. In an alternate embodiment, the signing key may be generated by encrypting the signatory's symmetric key using a private key (e.g., the identity verification token number 220) of the identity verification token 202, where the private key is a member of a public-private cryptographic key scheme. In this alternative embodiment, the corresponding public key to the identity verification token 202 private key may also be provided to the identity registrar 214 for storage in the data store 224. Alternatively, the identity registrar 214 may have already obtained the public key of the identity verification token 202 when the identity verification token 202 was registered with the identity registrar 214. In any case, because the identity verification token timestamp will be different for every signing, the sign key, and consequently the signature 212, will also be different for each signing event. The signature 212 may then be verified as having signed a document by providing the document identifier 206 to the identity registrar 214, whereupon the identity registrar may encrypt the document identifier 206 using the signing key and comparing the encrypted document identifier to the signature in the data store 224.

Figure 3:
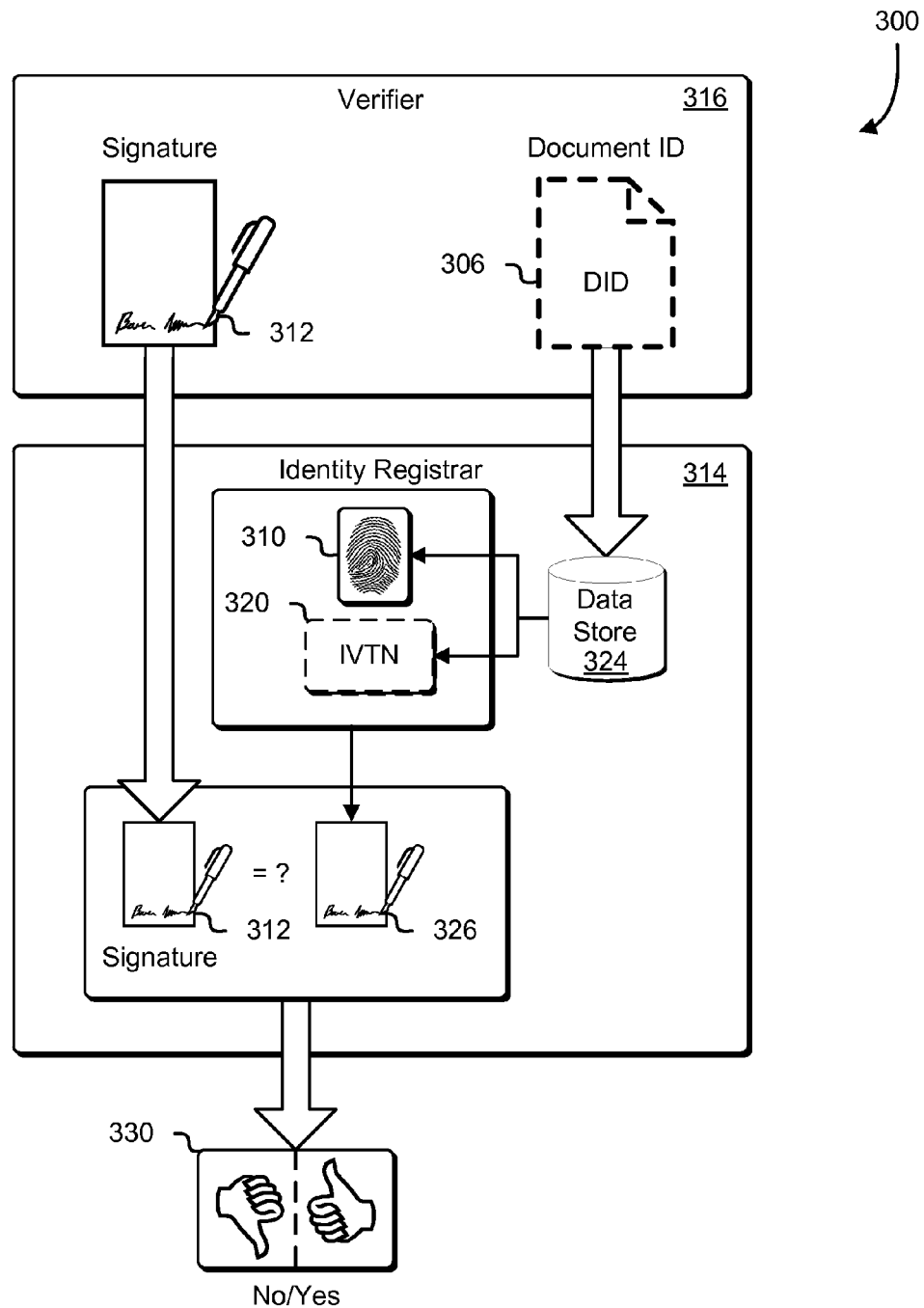
FIG. 3 illustrates an example of verifying a signature in accordance with an embodiment.

FIG. 3 illustrates an example 300 of verifying a signature 312 in an embodiment of the present disclosure. Specifically, FIG. 3 depicts a verifier 316 that receives a document identifier 306 and a signature 312 in a request for verification that the signature 312 is a valid signature for a document corresponding to the document identifier 306. The verifier 316 may be any suitable hardware or software configured to verify the signature 312, such as a credit card reader device, mobile phone, tablet computing device, or any electronic client device such as the electronic client device 1502 described in conjunction with FIG. 15. To verify the signature 312, the verifier 316 may provide the signature 312, the document identifier 306, and, in some cases, the timestamp, to the identity registrar 314. In response, the identity registrar 314 may provide a confirmation message 330 indicating whether the user corresponding to the user identifier 328 did indeed sign the document 304 corresponding to the document identifier 306 at the signing.

As noted, the identity registrar 314 may be a third party entity or central registrar, such as a service provider that provides an authentication service, and may have one or more computer systems in a distributed computing environment able to receive signatures and/or receive and send messages to the identity verification token and the verifier 316. The identity registrar may also have storage capabilities and may store information in a data store 324 sufficient to verify signatures, including one or more of document identifiers, proofs of credentials of users, identity verification token numbers, signatory identifiers, timestamps, and signatures. Proof of credentials 310 may be any information sufficient to verify that the corresponding user has possession of the credentials 310, which may be a hash of the credentials 310 (e.g., password or biometric data), encrypted credentials, or the credentials 310 themselves.

As an example of verification, the document 104 or a copy of the document 104 may be provided to the verifier 316 along with the signature 312, and the verifier 316 may determine the document identifier 306 from the document 104. In some cases, if the document 104 is a physical document, the document identifier 306 of the document 104 may be generated based on an optical scan (e.g., digital image or optical character recognition scan) of the document 104. The verifier may then provide the determined document identifier 306 and the signature 312 to the identity registrar 314 for verification. Alternatively, the verifier 316 may provide the scan of the document 104, as a digital image or as an optical character recognition scan of the document 104, and provide that data with the signature 312 to the identity registrar 314. The identity registrar 314 may then determine the document identifier 306 from the optical scan data for the purposes of verifying the signature 312.

In an example scenario, the customer 108 may be requesting a refund from the merchant 118 for a previous purchase. The customer 108 may present the document 104 (e.g., a receipt for the purchase) and the signature 312, which, as noted, may take a variety of forms, such as a cryptographic hash of characters, a printed bar code, or a quick response code to the merchant 118 for verification. Such signature 312 may be printed on a physical medium, displayed on a display of a mobile device, or sent through a network (e.g., e-mail, text message, etc.) In this example, the merchant 118 may provide, to the verifier 316, the document 104 or document identifier 306 for the document 104 and the signature 312. In turn, the verifier 316 may provide the document 104 or the document identifier 306 and the signature 312 to the identity registrar 314.

The identity registrar 314 may then look up the document identifier 306 in the data store 324 to retrieve the credentials 310 or proof of credentials, the identity verification token number 320, and, in some cases, a timestamp associated with the document identifier 306. Note, in some implementations, the identity registrar 314 may not store the actual signatures, but rather may store the parameter values used to generate the signatures. In such cases, the identity registrar 314 may look up and retrieve records associated with the document identifier 306, re-generate the signatures from the parameter values stored in the records, and determine whether any of the regenerated signatures are a match to the signature 312.

If the document 104 was provided to the identity registrar 114, the identity registrar 114 may, at this stage, derive the document identifier 306 from the document 104. In some embodiments, the identity registrar 314 may then process the document identifier 306, the credentials 310 or proof of credentials, and the identity verification token number 320 in the same manner as the signature 312 would have been generated (e.g., running the data through a cryptologic hash algorithm). If a result 326 of the processing matches the signature 312, then a confirmation message 330, indicating that the document 104 (e.g., the receipt for the purchase) was indeed the document signed, and, in some implementations, was signed at a time indicated by a timestamp, may be provided to the merchant 118. On the other hand, if either the document identifier 306 or signature 312 was not found in the data store 324, or if the result 326 of the processing did not match the signature 312, the confirmation message 330, indicating that either the signature 312 or document 104 presented is invalid, may be provided to the merchant 118.

As noted, in other embodiments, the identity verification token number may be a public-private key pair where the identity verification token has the private key and the identity registrar 314 has the corresponding public key. In these embodiments, the identity verification token number 320 in FIG. 3 may be said corresponding public key, and the verification operation may include decrypting at least a portion of the signature using the identity verification token number 320 public key.

Figure 4:
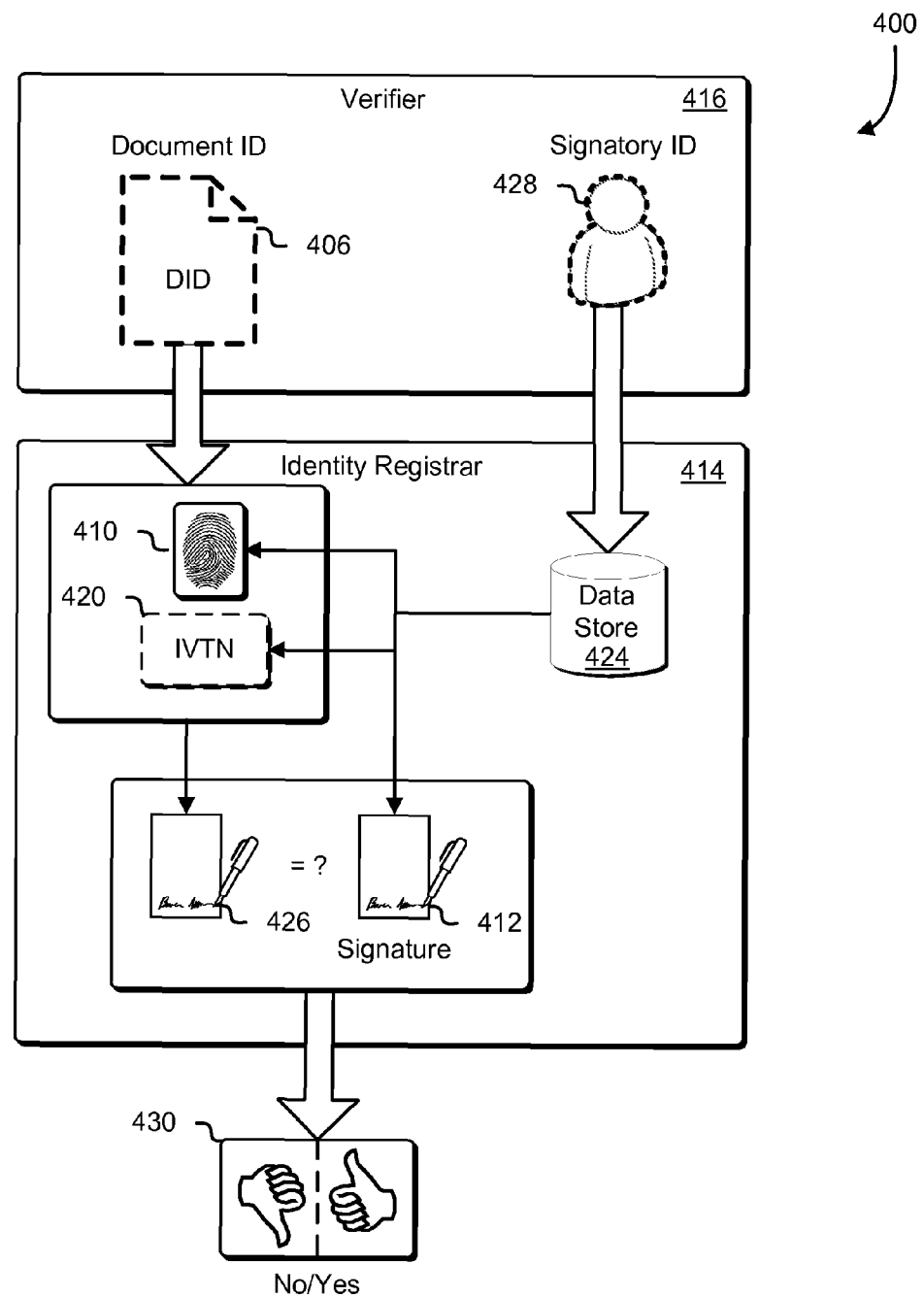
FIG. 4 illustrates an example of verifying a signatory in accordance with an embodiment.

FIG. 4 illustrates an example 400 of verifying that a user has signed a document in an embodiment of the present disclosure. Specifically, FIG. 4 depicts a verifier 416 that receives a document identifier 406 and a signatory identifier 428 of a user in a request for verification that the user has signed a document corresponding to the document identifier 406. The verifier 416 may be any suitable hardware or software configured to verify that the users signed the document in accordance with the present disclosure, such as a mobile phone, tablet computing device, or any electronic client device such as the electronic client device 1502 described in conjunction with FIG. 15. To verify the user, the verifier 416 may be provided the signatory identifier 428 of the user. In some embodiments, the signatory identifier 428 is obtained by querying the identity registrar 414 for the signatory identifier 428 of the user.

The user may be assigned a signatory identifier 428 when the user first registers with the identity registrar 414. When the user registers with the identity registrar 414, the user may present proof that the user is who the user claims to be, such as a driver's license, a passport, birth certificate, and/or social security card, in conjunction with a real-time image or in-person verification by a representative of the identity registrar 414 that the user matches the descriptive documents. In some cases the identity registrar 414 may require different levels of proof of identity depending on the nature of the document being signed. For example, the identity registrar 414 may require in-person proofing of the signatory if the document being signed is a mortgage; however the identity registrar 414 may only require that the user register with the last four digits of the user's social security number for logging into a website or for signing a software license agreement of an online game.

Upon registration of the user, the identity registrar 414 may store in a data store, such as the data store 424, information including one or more of the user's identity verification token numbers, the user's name, the user's social security number or national identity number, the user's password or verification data to prove the user's password (provided by the identity registrar 414 or the user), the signatory identifier of the user, biometric information about the user (e.g., fingerprint data), a duress password (described in further detail in FIGS. 9, 10, 13, and 14), and biometric information that may be used to indicate that the user is under duress (e.g., using a different finger for fingerprint information).

The signatory identifier 428 may also be associated with the credentials 410 of the user such that, in some applications of the present embodiment, the user may provide proof of possession of the credentials 410 to confirm the user's identity as the user corresponding to the signatory identifier 428. For example, when the customer 108 logs into the identity verification token 102, the customer 108 may provide the credentials 110 to the identity verification token 102 which may authenticate the customer 108 as corresponding to the signatory identifier 428. In some implementations, the signatory identifier 428 may be a parameter used in generating the signature 412.

As noted, the identity registrar 414 may be a third party entity or central registrar, such as a service provider that provides an authentication service, and may have one or more computer systems in a distributed computing environment able to receive signatures and/or receive and send messages to the identity verification token and the verifier 416. The identity registrar 414 may also have storage capabilities and may store information in a data store 424 sufficient to verify signatures, including one or more of document identifiers, proofs of credentials of users, identity verification token numbers, signatory identifiers, timestamps, and signatures. Proof of credentials 410 may be any information sufficient to verify that the corresponding user has possession of the credentials 410. This proof may be a hash of the credentials 410 (e.g., password or biometric data), encrypted credentials, or the credentials 410 themselves.

As an example of verification, the document 104 or a copy of the document 104 may be provided to the verifier 416 along with the signatory identifier 428, and the verifier 416 may determine the document identifier 406 from the document 104. In some cases, if the document 104 is a physical document, the document identifier 406 of the document 104 may be generated based on an optical scan (e.g., digital image or optical character recognition scan) of the document 104. The verifier may then provide the determined document identifier 406 and the signatory identifier 428 to the identity registrar 414 for verification. Alternatively, the verifier 416 may provide the scan of the document 104, as a digital image or as an optical character recognition scan of the document 104, and provide that data with the signatory identifier 428 to the identity registrar 414. The identity registrar 414 may then determine the document identifier 406 from the optical scan data for the purposes of verifying whether the user corresponding to the signatory identifier 428 signed the document 104.

In an example scenario, the merchant 118 may be a bank seeking to determine whether an applicant for a loan was a signatory to a required document (e.g., the document 104). The merchant 118 may present the document 104 (e.g., loan application) or the document identifier 406 and the signatory identifier 428 of the applicant to the verifier 416. In turn, the verifier 416 may provide the document 104 or the document identifier 406 and the signatory identifier 428 to the identity registrar 414. If the document 104 was provided to the identity registrar 114, the identity registrar 114, at this stage, may derive the document identifier 406 from the document 104. The identity registrar 414 may then look up the signatory identifier 428 in the data store 424 to retrieve the signature 412, the credentials 410 or proof of credentials, the identity verification token number 420, and, in some cases, a timestamp associated with the signature event. The identity registrar 414 may then process the document identifier 406, the credentials 410 or proof of credentials, and the identity verification token number 420 in the same manner as the signature 412 would have been generated (e.g., running the data through a cryptologic hash algorithm).

As noted, in other embodiments, the identity verification token number may be a public-private key pair where the identity verification token has the private key and the identity registrar 414 has the corresponding public key. In these embodiments, the identity verification token number 420 in FIG. 4 may be said corresponding public key, and the verification operation may include decrypting at least a portion of the signature using the identity verification token number 420 public key.

Note that, because the applicant may have signed or co-signed multiple documents, used multiple identity verification tokens, and changed credentials over time, multiple records of signing events may be retrieved in association with the signatory identifier 428 of the applicant. However, in some implementations, the number of records retrieved may be reduced with additional criteria, such as filtering by the document identifier 406, filtering by date ranges for the signing event, and filtering by identity verification token numbers, etc. In a case where multiple records are retrieved, the aforementioned processing may be performed on the data retrieved from the multiple records in order to determine which of the signing documents matches up with the signature 412.

If a result 426 of the processing matches the signature 412, then a confirmation message 430, indicating that the document 104 (e.g., the required loan application document) was indeed signed by the applicant, and, in some cases, was signed at a time indicated by a timestamp, may be provided to the merchant 118. On the other hand, if either the document identifier 406 or signatory identifier 428 was not found in the data store 424, or if the result 426 of the processing did not match the signature 412, the confirmation message 430, indicating that either document 104 presented is invalid or that the applicant associated with the signatory identifier did not sign the document 104, may be provided to the merchant 118.

Note, although not illustrated, other information regarding the signature event may be verified by a verifier other that depicted by FIGS. 3 and 4, based on the data stored at the identity registrar corresponding to the signing event. For example, a document identifier and a timestamp or time range may be passed to the verifier to verify that the document was signed at the time indicated by the timestamp or time range. A document identifier and an identity verification token number may be passed to the identifier to verify that the corresponding identity verification token was used in the signing or to retrieve a list of all parties who signed the document using the identity verification token. Proof of credentials may be passed as an alternative to the signatory identifier 428 to verify that the corresponding user signed the document. A signature may be passed to the verifier to retrieve the document or document identifier that was signed. A document identifier may be provided to the verifier to retrieve a list of all signing parties. Proof of credentials or a signatory identifier may be passed to the verifier to retrieve a list of documents or document identifiers that have been signed by the user corresponding to the credentials or signatory identifier. Generally, one or more of items of any of the data stored by the identity registrar concerning the signing event may be provided to retrieve additional recorded information about the signing event or events corresponding to the one or more items of data.

Figure 5:
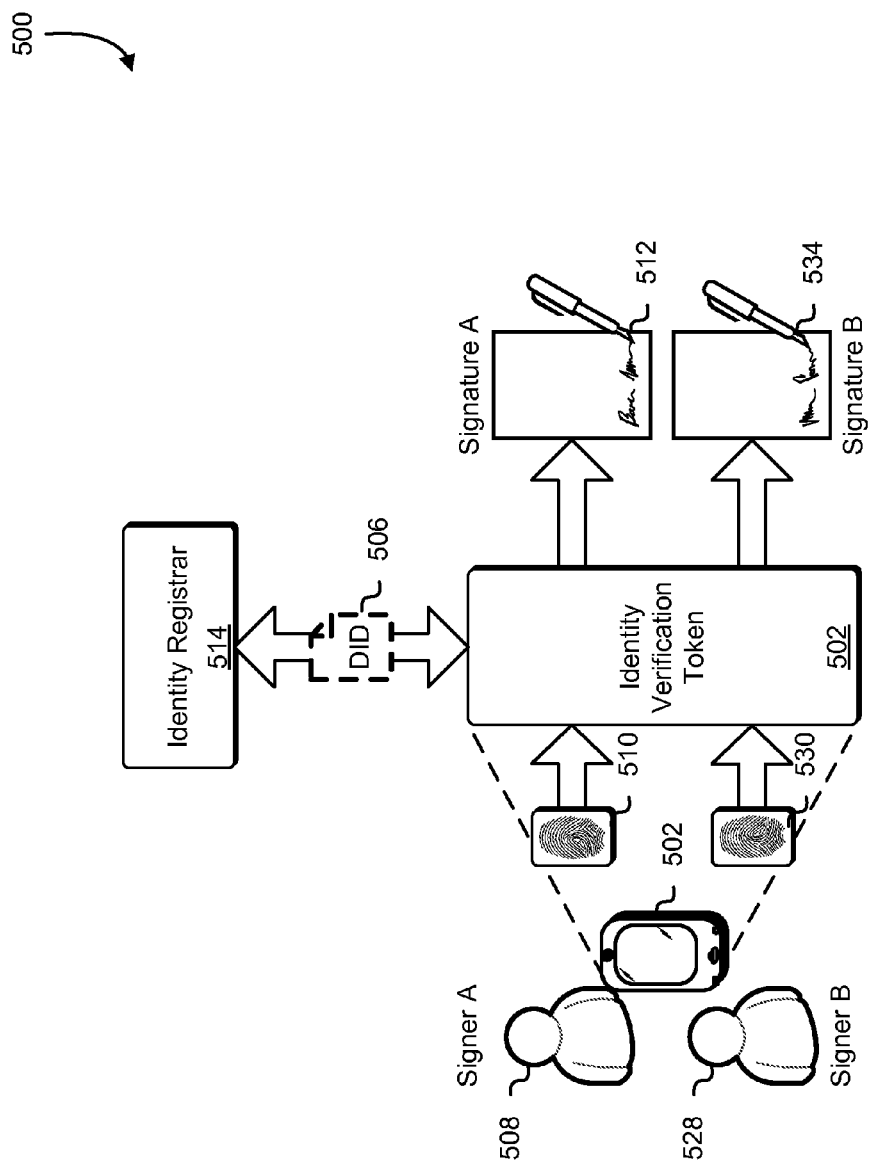
FIG. 5 illustrates an example of multiple signatories signing a document with a single identity verification token in accordance with an embodiment.

FIG. 5 illustrates an aspect of an environment 500 in which an embodiment may be practiced. Specifically, FIG. 5 depicts an environment where multiple signatories, such as a first signatory 508 and a second signatory 528, co-sign on a document using the same identity verification token 502, to produce multiple signatures, a first signature 512 and a second signature 534, of the same document. The first signature 512 and the second signature 534 may be stored by the identity registrar 514 and verified by a verifier at a later date.

As with the identity verification token 102 of FIG. 1, the identity verification token 502 may be an item used by the first signatory 508 and the second signatory 528 to perform the signing, and may comprise software or hardware configured in the manner described in conjunction with the identity verification token 102 of FIG. 1. An example of an application of the environment 500 may be a situation where two persons co-sign on a loan application. The document identifier 506 may be generated for or derived from a document to be signed, such as the document 104 of FIG. 1.

The first signatory 508 may provide the first set of credentials 510 sufficient to prove the identity of the first signatory 508 to the identity verification token 502. Providing the first set of credentials 510 may also serve to indicate the presence of the first signatory 508 at the time of the signing. Examples of the first set of credentials 510 include passwords, fingerprint patterns and other biometric data, or other data indicating presence of the first signatory 508 at the signing. The first set of credentials 510 may also be linked to an signatory identifier of the first signatory 508. Likewise, the second signatory 528 may provide a second set of credentials 530 sufficient to prove the identity of the second signatory 528 to the identity verification token 502. Providing the second set of credentials 530 may also serve to indicate the presence of the second signatory 528 at the time of the signing. As with the environment 100 of FIG. 1, additional data may also be provided to or be available to the identity verification token 102, such as global positioning data indicating the location of the signing. Such additional data may also be used in generating the first signature 512 and the second signature 534 and/or be stored with the identity registrar 514 in association with the signing event.

As noted, the first set of credentials 510, the document identifier 506, an identity verification token number identifying the identity verification token 502 may be used by the identity verification token 502 to generate the first signature 512 for the document associated with the document identifier 506. Likewise, the second set of credentials 530, the document identifier 506, an identity verification token number identifying the identity verification token 502 may be used by the identity verification token 502 to generate the second signature 534 for the document associated with the document identifier 506. Having both the first signature 512 and the second signature 534 generated in conjunction with the document identifier 506 serves to indicate that both the first signatory 508 and the second signatory 528 have signed the document associated with the document identifier 506. In some embodiments, other data provided to or otherwise available to the identity verification token 502, such as the global positioning data indicating the location of the signing is used to generate the first signature 512 and the second signature 534. These signatures and other data may be stored with the identity registrar 514 as an attestation of the signing event.

As another example, the first signatory 508 and the second signatory 528 may be prospective patrons of a pub. The pub may present, upon entering, a display screen that asks, "Are you over 21 years of age?" This display screen may have a corresponding identifier represented by the document identifier 506. The first signatory 508 may have a mobile phone configured to be the identity verification token 502 and may enter the proof of the first set of credentials 510 into the identity verification token 502 as an attestation by the first signatory 508 that he/she is over the age of 21. The identity verification token 502 may generate the first signature 512 and provide it to the identity registrar 514 and/or a verifier of the pub. Likewise, the second signatory 528 may be authorized to also use the identity verification token 502, and may and enter proof of the second set of credentials 530 into the identity verification token 502 as attestation by the second signatory 528 that he/she is also over the age of 21.

The identity verification token 502 may generate the second signature 534 and present to the identity registrar 514 and/or the verifier of the pub.

As still another example the first signatory 508 may be a user of a computer system configured with a registered identity verification token 502, and the second signatory 528 may be a "system" user of the operating system. In this example, the document identifier 506 may represent a confirmation dialog for an application, such as a file backup application, whether the user wishes to proceed with running the application. At times when the user is present and logged on, the user may use the proof of the first set of credentials to agree to confirm. At other times, the system may, if authorized, automatically submit its proof of the second set of credentials to confirm.

Alternatively, in the above examples, the identity verification token may reside in software in a hardware-secured execution environment. In such a case, a different identity verification token may be launched within the hardware-secured execution environment to separately receive proofs of the sets of credentials for each signatory. In some implementations, the identity registrar 514 may keep a record of the ages of the registered users, and in such implementations, the verifier of the pub may also verify that the first signatory 508 and the second signatory 528 are indeed over the age of 21. Note too, that in some embodiments, the first signatory 508 and the second signatory 528 may sign the document 504 in a similar manner using separate identity verification tokens.

Figure 6:
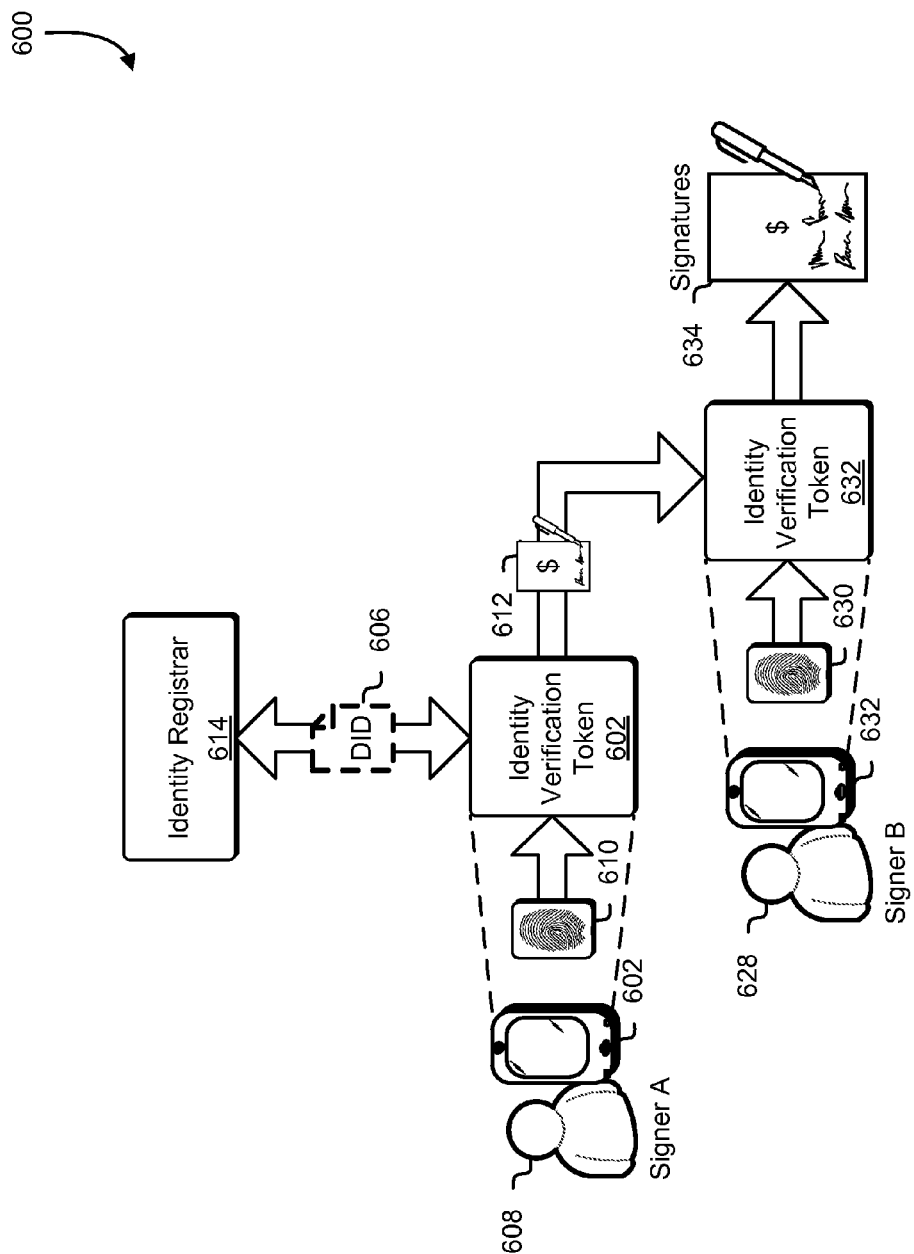
FIG. 6 illustrates an example of a signatory attesting to a signature of another signatory in accordance with an embodiment.

FIG. 6 illustrates an aspect of an environment 600 in which an embodiment may be practiced. Specifically, FIG. 6 depicts an environment where a document may need to go through multiple levels of signatures; i.e., a document corresponding to a document identifier 606 may be signed by a first signatory 608 using a first identity verification token 602 and a first set of credentials 610 to generate a signed document 612. Later, the signed document 612 may be signed by a second signatory 628 using a second identity verification token 632 to produce a signature result 634 representing both signatures.

As with the identity verification token 102 of FIG. 1, the first identity verification token 602 and the second identity verification token 632 may be items used by the first signatory 608 and the second signatory 628 to perform the signing, and may comprise software or hardware configured in the manner described in conjunction with the identity verification token 102 of FIG. 1. An example of an application of the environment 600 may be a situation where the second signatory 628 is a notary public who signs to attest to signing by the first signatory 608 of the document associated with the document identifier 606. As noted, the document identifier 606 may be generated for or derived from a document to be signed, such as the document 104 of FIG. 1.

The first signatory 608 may provide the first set of credentials 610 sufficient to prove the identity of the first signatory 608 to the first identity verification token 602. Providing the first set of credentials 610 may also serve to indicate the presence of the first signatory 608 at the time of the first signing. Examples of the first set of credentials 610 include passwords, fingerprint patterns and other biometric data, or other data indicating presence of the first signatory 608 at the first signing. The first set of credentials 610 may also be linked to an signatory identifier of the first signatory 608. Likewise, the second signatory 628 may provide a second set of credentials 630 sufficient to prove the identity of the second signatory 628 to the second identity verification token 632. Providing the second set of credentials 630 may also serve to indicate the presence of the second signatory 628 at the time of the second signing. As with the environment 100 of FIG. 1, additional data may also be provided to or be available to the first identity verification token 602 and/or the identity verification token 631, such as global positioning data indicating the locations of the signings. Such additional data may also be used in generating the signed document 612 and the signature result 634 and/or be stored with the identity registrar 614 in association with the signing event.

The first set of credentials 610, the document identifier 606, an identity verification token number identifying the first identity verification token 602 may be used by the first identity verification token 602 to generate the signed document 612 for the document associated with the document identifier 606. The document identifier 606 and the signed document 612 may be provided to the second identity verification token 632 for signing by the second signatory 628. In some embodiments, the signed document 612 (or first signature) can additionally be provided to the identity registrar 614, a verifier, the first signatory 608, or other requesting entity, such as an entity requesting the document to be signed (e.g., a bank, a merchant, etc.). The second set of credentials 630, an identity verification token number identifying the identity verification token 502, and, instead of or in addition to the document identifier 606, the signed document 612 may be used by the second identity verification token 632 to generate the signature result 634. Having the second signatory 628 signing the signed document 612 instead of or in addition to the document associated with the document identifier 606 provides attestation by the second signatory 628 of the signature of the first signatory 608. In some embodiments, other data provided to or otherwise available to the first identity verification token 602 and/or to the second identity verification token 632, such as global positioning system location data indicating the location of the signings are used to generate the signed document 612 and the signature result 634 (or second signature). These signatures and other data may be stored with the identity registrar 614 as an attestation of the signing events.

Figure 7:
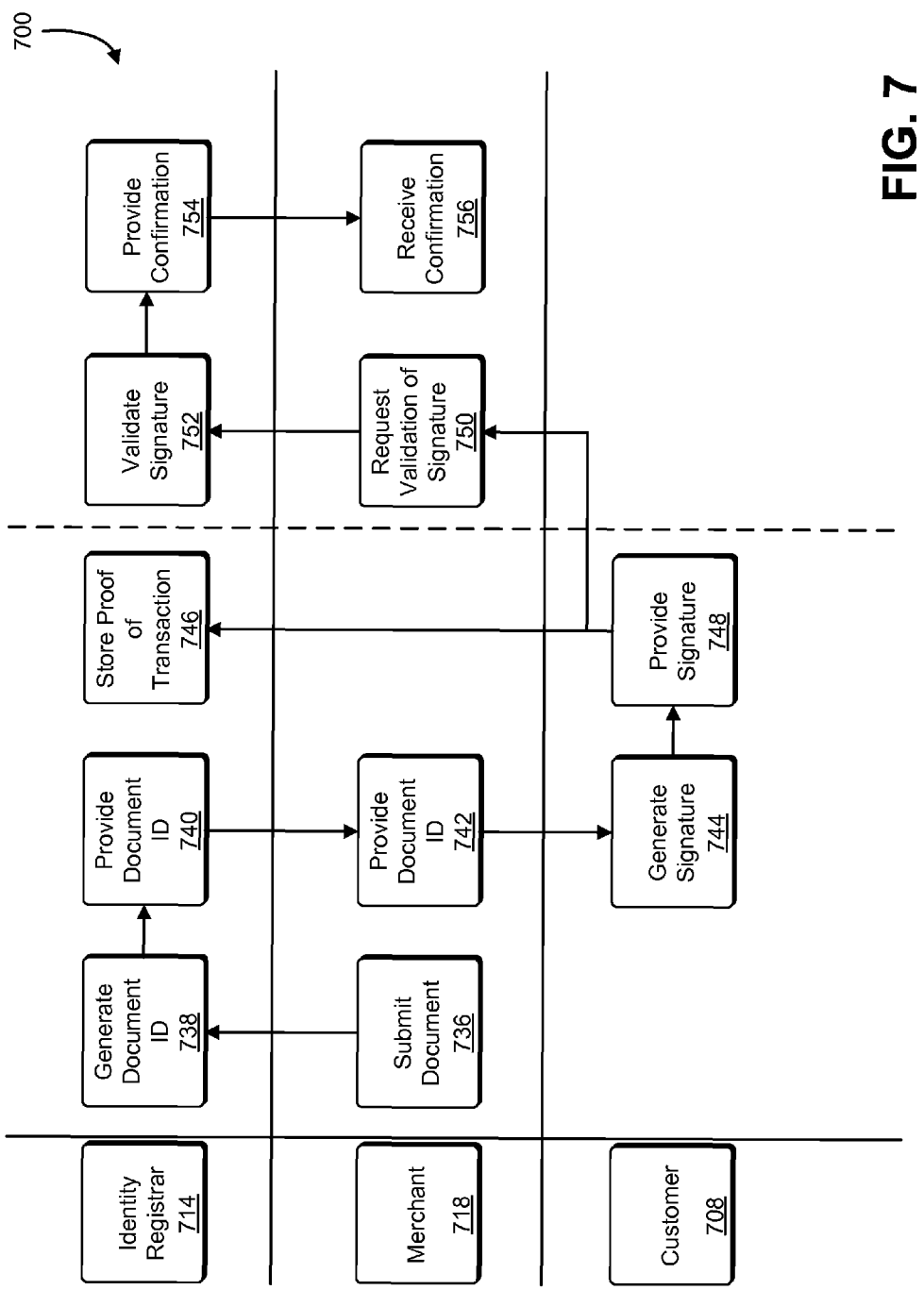
FIG. 7 illustrates an example of a process for generating and verifying a signature of a document in accordance with an embodiment.

FIG. 7 is a diagram that illustrates an example embodiment 700 of the present disclosure. Specifically, FIG. 7 depicts a transaction between a merchant 718 and a customer 708. In 738, the merchant 718 submits a document (e.g., a receipt, purchase agreement, contract, etc.) to an identity registrar 714 in a request for a document identifier for the document. As noted, the request and document may be submitted through an application programming interface provided by the identity registrar 714. Upon receipt of the document, the identity registrar 714 may generate the document identifier for the document. As noted, the document identifier may be a hash of the document or may be some other identifier for identifying the specific document.

In 740, the identity registrar 714 responds to the merchant 718 request by provided the document identifier generated in 738. Upon receipt of the document identifier, in 742, the merchant 718 may provide the document identifier to the customer 708. In 744, the customer 708 may verify that the received document identifier corresponds to the document presented to the customer 708 by the merchant 718 in a manner described in the present disclosure. For example, in some implementations, the customer 708 may input the document identifier (e.g., scanned from a screen of a device of the merchant 718, scanned from a quick response code, typed via a touch screen) into an identity verification token of the customer 708, and the identity verification token may communicate with an identity authority to obtain an electronic copy of the document which may be visually compared with the document presented by the customer 708. In another example, the customer 708 may scan the document presented with an identity verification token of the customer 708 to generate an electronic copy of the document, and the identity verification token may upload the electronic copy and receive a document identifier that may be confirmed by the customer 708 to match the document identifier presented to the identity verification token (or may be provided with a confirmation from the identity registrar that the electronic copy does correspond to the document identifier). Additional details may be found in the descriptions of the figures of the present disclosure. Once satisfied, the customer 708 may use a registered identity verification token to generate the signature in a manner described in the present disclosure (e.g., inputting credentials and causing the credentials, an identity verification token number, and document identifier to pass through a cryptographic hash algorithm, and, in some implementations, a timestamp, etc.).

In 748, the customer 708 may provide the signature to the identity registrar 714 and/or the merchant 718. Note that in some embodiments, the identity registrar 714 does not keep track of individual transactions, and may only be used to verify that the customer 708 could have signed the particular document. In such embodiments, the customer 708 does not provide the signature to the identity registrar 714. In 746, the identity registrar 746 may store the one or more elements of the transaction (e.g., document identifier, proof of the credentials used in generating the signature, identity verification token number, and timestamp of the transaction) as proof of the transaction.

In 750, the merchant, having received the signature, may request that the identity registrar validate the signature provided by the customer. The dashed line is intended to represent that the validation operations may occur at a time much later in the future, or, alternatively may be performed after the merchant 718 receives the signature from the customer. The request from the merchant may include the signature and the document identifier, and in some cases, additional information for identifying the transaction. As noted, is some cases, validation may be performed by other authorized entities other than the merchant 718. In 752, the identity registrar may validate the signature by, for example, taking the document identifier, looking for a record in a data store for the transaction associated with the document identifier and determining whether the provided signature matches the signature associated with the recorded transaction.

In 754, the identity registrar may provide confirmation (e.g., "The signature is verified," "The signature cannot be verified," etc.) to the merchant 718 regarding the signature validation of 752. In 756, the merchant 756 receives the confirmation provided by the identity registrar 714 in response to the request made by the merchant in 750.

Figure 8:
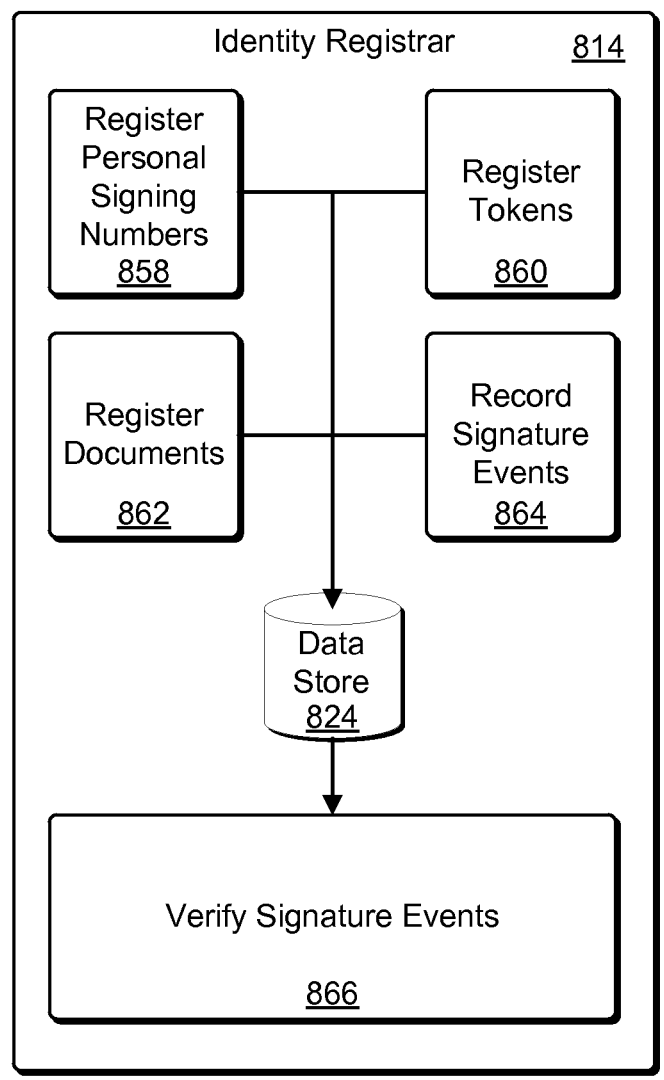
FIG. 8 illustrates an example of an identity registrar in accordance with an embodiment.

FIG. 8 is a diagram that illustrates an example depicting major operations of an identity registrar 814. As shown in 858, the identity registrar 814 may be responsible for registering users of the signature system and personal signing numbers assigned to the registered users as described in the present disclosure. As shown in 860, the identity registrar 814 may be responsible for registering identity verification tokens and their corresponding identity verification token numbers, as described in the present disclosure. As shown in 862, the identity registrar 814 may be responsible for receiving documents and issuing document identifiers for the received documents, and as shown in 864, the identity registrar 814 may record signing events as described in the present disclosure. These operations may store their respective data in one or more data stores, such as data store 824. This data store 824 may be accessed when, as shown in 866, the identity registrar 814 verifies signature events and signature data.

Figure 9:
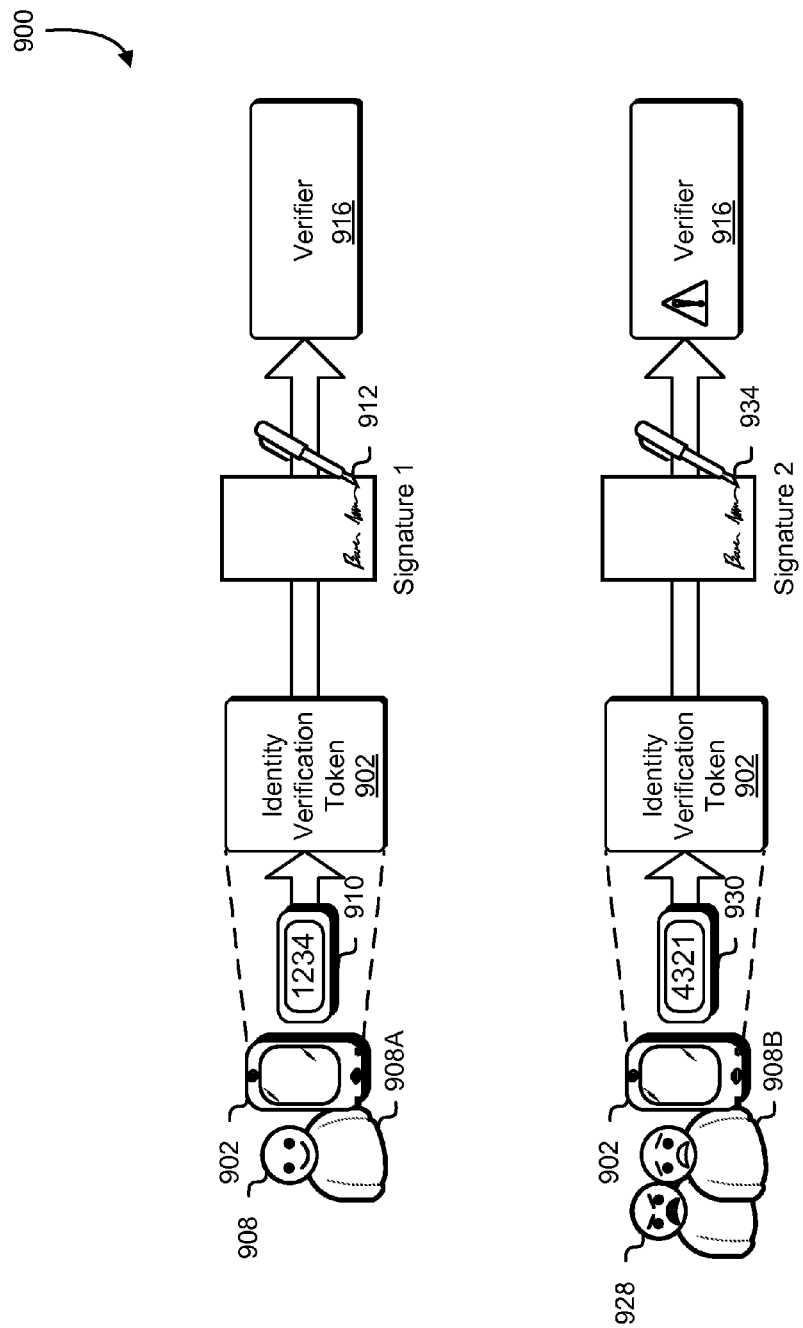
FIG. 9 illustrates an example of signing a document under duress in accordance with an embodiment.

FIG. 9 illustrates an aspect of an environment 900 in which an embodiment may be practiced. Specifically, FIG. 9 depicts a first situation, where a consenting signatory 908A willingly signs a document without duress according to the present disclosure, as contrasted to a situation where a reluctant signatory 908B signs a document under duress according to the present disclosure. In a first situation, the consenting signatory 908A may provide proof of consenting credentials 910, such as a four-digit personal identification number, to an identity verification token 902. Using the methods described in the present disclosure, the identity verification token 902 may generate a consenting signature 912 which may be transmitted to an identity registrar for recordation and/or provide the consenting signature 912 to a verifier 916. The verifier 916 may verify the consenting signature 912, in accordance with the methods described in the present disclosure, and determine that the consenting signatory 908A did indeed validly sign the presented document.

In contrast, in a second situation an antagonist 928 may be forcing the reluctant signatory 908B into signing the presented document. The reluctant signatory 908B may enter proof of duress credentials 930 into the identity verification token 902 to signal that the signing occurred under duress. In some examples, "duress" may refer to a situation whereby a signatory may sign a document under threat, coercion, under protest, or otherwise unwillingly. As one example, the reluctant signatory 908B may be signing a document under threat of force by the antagonist 928. As another example, the reluctant signatory 908B may be signing a contract presented by the antagonist 928 which contains terms the reluctant signatory 908B considers unfair, and therefore signs by providing the duress credentials 930 to indicate his dissatisfaction with the terms without alerting the antagonist 928 to this fact.

In some cases, the identity verification token 902 may be able to take biometric readings of a signatory and the identity verification token may be configured to automatically make a determination whether the signing is occurring under duress. For example, the identity verification token may be able to detect one or more physiological or behavioral characteristics through various sensors that may be present on the identity verification token 902. Examples of physiological characteristics include facial expressions, pheromones, deoxyribonucleic acid, pupil dilation, body temperature, sweat, heart rate, blood pressure, and fingerprints. Examples of behavioral characteristics include gestures, finger swipes, breathing patterns, muscle tremors, gait, vocal patterns, and typing rhythms. Such determination may be made based on detecting changes in one or more of the characteristics from an expected norm from the signatory and/or a level of the one or more of the characteristics above or below a determined threshold. Such determination may additionally be made based on other factors, such as location and time of day.

For example, a signature event may be determined as more likely duress if it occurs at midnight on a weekday than if it occurs on a Sunday morning. Note, that such automatic detection may detect potential duress but not actual duress; for example, the physiological and behavioral characteristics of the signatory after a morning jog may be similar enough to characteristics suggesting duress that the identity verification token determines to flag the signature. In this manner, the identity registrar or other third party entity may, upon receipt or confirmation of the potential duress signature, be alerted, and may follow up by contacting the signatory (e.g., to confirm that the signatory really did intend to withdraw $300, while sweating with an elevated heart rate, from an automated teller machine at midnight). In such a case, even if the signatory signs the document with the consenting credentials 910, the identity verification token 902 may substitute the consenting credentials 910 with its own duress credentials, insert a bit or byte, or otherwise flag (e.g., adding an additional parameter value indicating potential duress to the signature-generating algorithm) that the signature was potentially obtained under duress.

In some embodiments, there may be multiple levels of duress. For example, one level of duress may be "no duress." Another level of duress may be that the signatory unambiguously signed under duress (e.g., by using predetermined duress credentials). Other levels of duress indicating likelihood of duress—or other state of mind (e.g., anxiety, confusion, coercion, etc.) may also be possible. In some embodiments, the identity verification token 902 includes an additional parameter indicating a duress confidence score in the parameters used to generate the signature. That is, the duress confidence score may reflect a rating determined by the identity verification token 902 on how likely it is that the signatory is signing under duress, based on an evaluation of measurements of one or more of the factors mentioned above. As an example, a rating of zero may indicate that signs point to no duress, a rating of three may indicate a suspicion of duress, and a rating of five may indicate that duress is highly likely.

Note that such biometric data may additionally or alternatively indicate agitation, stress, intoxication, nervousness, distress, and other similar states. Such indications may also be useful to capture when signing. For example, if a signatory signs in a manner described in the present disclosure for a weapon or pharmaceutical purchase, recording the current biometric state of the purchaser (e.g., agitated, intoxicated, etc.) may provide useful data later. Furthermore, the location of the identity verification token 902 and/or the type of document being signed using the identity verification token 902 may be a factor in determining the possible physiological or behavioral state of the purchaser, and/or whether the signing was sanctioned or unsanctioned. In some examples, an "unsanctioned" signing event may refer to a signing that occurred without the permission of the registered identity verification token owner or exceeded the registrar of the signatory. For example, if the signatory was not authorized to sign for certain types of transactions, signing for those certain types of transactions would be "unsanctioned." Conversely, signature events that occur with the permission of the identity verification token owner or occur within the registrar of the signatory may be referred to as "sanctioned."

For example, biometric data indicating anxiety may lead the identity verification token 902 to reach a different confidence score if a global positioning system location indicates that the signing event occurred in the signatory's workplace and the document was a service contract versus a signing event that occurs in a sporting goods store and the document is a registration for purchasing a weapon. Based on a high confidence rating of the existence of the signatory being in one or more of these states, a verifier may notify the merchant or other entity that intervention may be advisable. Similarly, recording the current biometric state of the signatory for purchases leading up to such a weapon or pharmaceutical purchase may also provide useful data for investigators, such as providing a timeframe or trending information about the purchaser's physiological or behavioral state, should the purchase lead to an unfortunate incident.

An identity verification token 902 of the signatory may also be configured to track the behavior patterns of the signatory based on past signing events. Based on the tracked behavior patterns, the identity verification token 902 may be configured to flag signing events (e.g., by inserting one or more additional parameters into the signature generation algorithm) that suggest an atypical signature event. For example, a purchase of a weapon when the past signing events suggest such a purchase as uncharacteristic. Such a purchase may also indicate theft and an unsanctioned use of the identity verification token 902 by an unauthorized party. As another example, executing a Will soon after taking out a large life insurance policy may be an event the identity verification token 902 determines worth noting, particularly if biometric data indicates possible duress or anxiety.

Like the consenting credentials 910, the duress credentials 930 may be established between the identity registrar and the registered signatory, but must be different than the consenting credentials 910. Note that, although the consenting credentials 910 and the duress credentials 930 are depicted in FIG. 9 as personal identification numbers, as with all credentials described in the present embodiment the consenting credentials 910 and the duress credentials 930 may be one or more of a variety of credential types. For example, the consenting credentials 910 may be a fingerprint from the second digit of a right hand of the consenting signatory 908A, whereas the duress credentials 930 may be a fingerprint from the fifth digit of a left hand of the reluctant signatory 908B. As another example, the consenting credentials 910 may be the password, "cratchit," whereas the duress credentials 930 may be the password, "scrooge."

Similar to how the consenting signature 912 may be generated based at least in part on the document identifier, the identity verification token number of the identity verification token 902, and the consenting credentials 910, the duress signature 934 may be generated based on the document identifier, the identity verification token number of the identity verification token 902, and the duress credentials 930. As an example, the duress signature 934 may be a cryptographic hash of the provided data, such as may be produced by a cryptographic hash function like MD5, MD6, SHA-1, and SHA-2. In some embodiments, other data provided to or otherwise available to the identity verification token 902 such as global positioning system data is used additionally or alternatively to generate the duress signature 934. In some embodiments, both the consenting signature 912 the duress signature 932 are generated in a secure execution environment, such as a Trusted Platform Module or Intel Software Guard eXtensions environment. In other embodiments, the both the consenting signature 912 and the duress signature 932 are generated via an application-specific integrated circuit designed to generate such signatures.

The identity verification token may respond by generating a duress signature 934, and submitting the duress signature 934 to the identity registrar for recordation and/or provide the duress credentials 930 to the verifier 916. To all appearances, the duress signature 934 may appear to be a valid signature. In some embodiments, however, verification of the duress signature 934 causes certain events to occur. For example, if the reluctant signatory 908B is being forced to make a purchase from a merchant by the antagonist 928, when the merchant utilizes the verifier 916 to verify the signature, the verifier 916 may display a message to the merchant, "Call 911." As noted, however, in some implementations, only certain verifiers may be alerted that the reluctant signatory 908B has used the duress credentials 930. For example, in order to not subject the merchant to possible risk, the verifier 916 of the merchant may receive confirmation from the identity registrar that the duress signature 934 is a valid signature (no different than the consenting signature 912). However, in some implementations, the identity registrar may be configured to detect duress signatures and relay the information to appropriate authorities (e.g., police). Similarly, in some implementations, the identity verification token 902 may be configured to recognized different users or signatories, and may be configured to alert the identity registrar if a particular signatory uses the identity verification token 907 or exceeds a designated level of signing registrar. As an example, if a child of the owner of the identity verification token 902 makes a purchase, the identity verification token 902 may notify the identity registrar of this occurrence, which in turn may inform the owner of the identity verification token 902 about the purchase. However, in other implementations, the duress signature 934 may only be recorded by the identity registrar, and later verification may allow certain parties (e.g., police investigators, the reluctant signatory 908B, etc.) to show that the signature made was the duress signature 934.

As another example, if the reluctant signatory 908B is being forced by the antagonist 928 to log into the bank account of the reluctant signatory 908B through an automated teller machine, the reluctant signatory 908B may enter proof of the duress credentials 930 as the personal identification number. In response, rather than displaying the full balance of the bank account of the reluctant signatory 908B, the automated teller machine may display a "fake" account that has a much smaller balance (e.g., $20) in it than the real account. In this manner, the antagonist 928 is given to believe that the fake account is real, as the antagonist 928 would not be aware that the duress credentials 930 were not the consenting credentials 910. Additionally, the reluctant signatory 908B would be able to prevent his/her actual bank account from being plundered without discernibly defying the antagonist 928. Furthermore, the duress signature 934 would be on file with the identity registrar, and an authorized entity, such as a criminal investigator, may be able to confirm that the reluctant signatory did indeed indicate that they were signing under duress. In another example, generation of the duress signature 934 may cause transactions associated with the signing event to be repudiated; that is, transactions made using the duress signature may be considered disclaimed or rejected. In some implementations, repudiation may be delayed such that, for a first period (e.g., 48 hours), an identity registrar may, if queried, confirm validity of the signature, but after the first period, the identity registrar may indicate that the signature is invalid or made without consent.

As another example, the reluctant signatory 908B may be being forced by the antagonist 928 to log into an e-mail account of the reluctant signatory 908B. By signing into the e-mail account using the duress credentials 930, a verifier of the e-mail service may recognize the duress signature 934, and respond by displaying a "fake" e-mail account. The fake e-mail account may be preconfigured, by the signatory or the e-mail service, to display realistic or actual e-mail messages, but different e-mail messages than would be displayed had the signatory used the consenting credentials 910. In some embodiments, the e-mail account would be configured to flag one or more messages, contacts, tasks, calendar events, or other data to be hidden in the event the duress credentials 930 are used to log into the e-mail account. In such an embodiment, signing into the e-mail account using the duress credentials 930 would open the actual e-mail account of the reluctant signatory 908B, but the e-mail items so flagged would be hidden without evidence revealing their existence.

In some embodiments, the identity verification token 902 is configured with constraints on the types of transactions that may be signed for or types of transactions that should be flagged by the identity verification token 902 (e.g., including one or more additional parameters in generation of the signature). As an example, the identity verification token 902 of the present embodiment could be embodied as a gift card usable for making purchases. However, in this example, the identity verification token 902 also has a been provided a constraint that it may not be used for certain purchases (e.g., liquor or tobacco) or must flag the signature used in those purchases in accordance with the methods described in the present disclosure.

Figure 10:
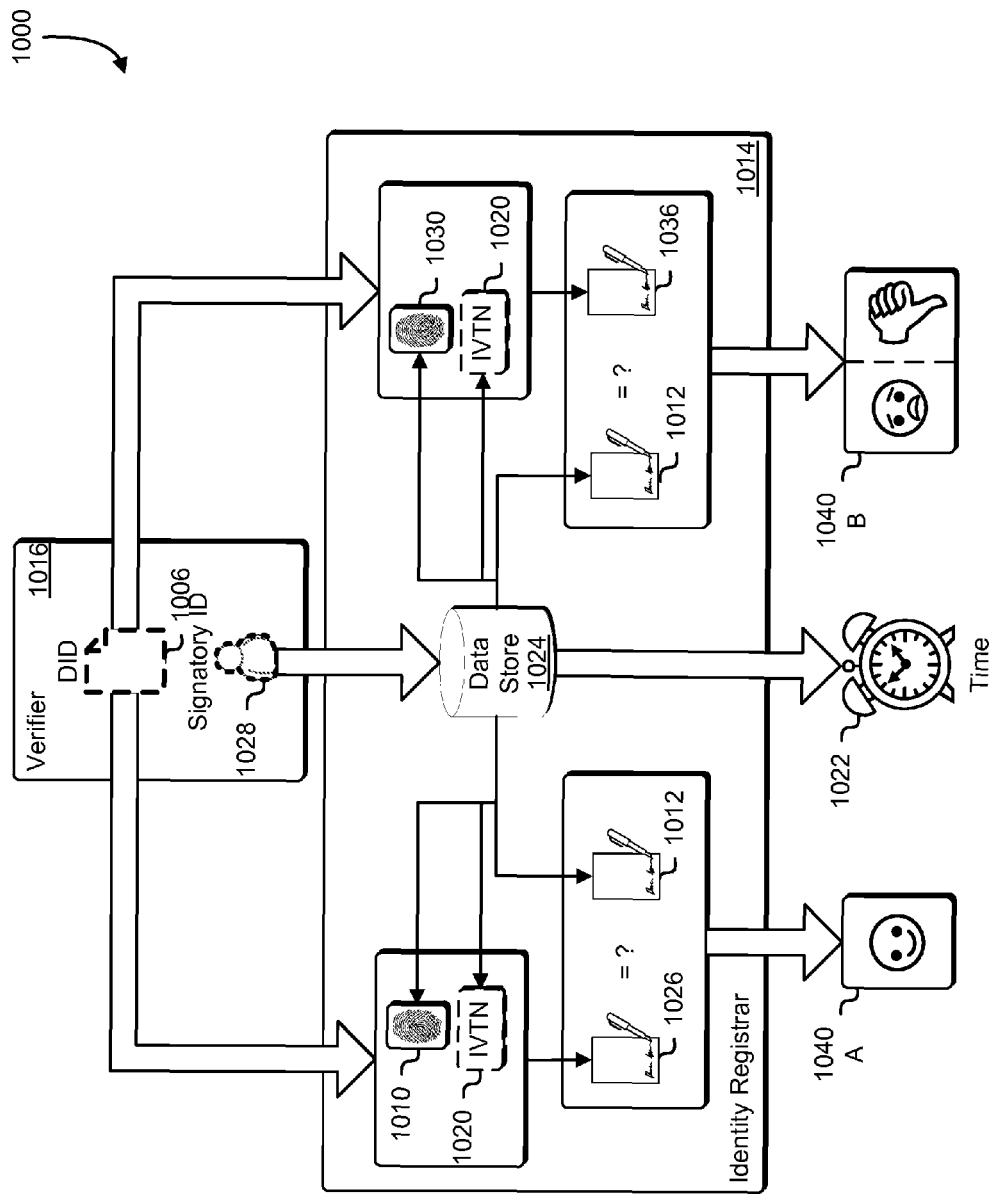
FIG. 10 illustrates an example of verifying a duress signature in accordance with an embodiment.

FIG. 10 illustrates an example 1000 of verifying whether a user has signed a document with a normal (consenting) signature or a duress signature in an embodiment of the present disclosure. Specifically, FIG. 10 depicts a verifier 1016 that receives a document identifier 1006 and a signatory identifier 1028 of a user in a request for verification that the user has signed a document corresponding to the document identifier 1006. The verifier 1016 may be any suitable hardware or software configured to verify that the users signed the document in accordance with the present disclosure, such as a mobile phone, tablet computing device, or any electronic client device such as the electronic client device 1502 described in conjunction with FIG. 15. To verify the user, the verifier 1016 may be provided the signatory identifier 1028 of the user. In some embodiments, the signatory identifier 1028 is obtained by querying the identity registrar 1014 for the signatory identifier 1028 of the user. The signatory identifier 1028 may be assigned to the user in a similar manner as described in conjunction with the signatory identifier 428 of FIG. 4.

The signatory identifier 1028 may also be associated with the consenting credentials 1010 and the duress credentials 1030 of the user such that, in some applications of the present embodiment, the user provides proof of possession of the consenting credentials 1010 or the duress credentials 1030 to confirm the user's identity as the user corresponding to the signatory identifier 1028. For example, when the consenting signatory 908A logs into the identity verification token 902, the consenting signatory 908A may provide the consenting credentials 910 to the identity verification token 902 which may authenticate the consenting signatory 908A as corresponding to the signatory identifier 1028. Similarly, if the reluctant signatory 908B logs into the identity verification token 902, the reluctant signatory 908B may provide the duress credentials 930 to the identity verification token 902 which may authenticate the customer 908B as corresponding to the signatory identifier 1028. In some implementations, the signatory identifier 1028 may be a parameter used in generating the consenting signature 912 or the duress signature 934.

As noted, the identity registrar 1014 may be a third party entity or central registrar, such as a service provider that provides an authentication service, and may have one or more computer systems in a distributed computing environment able to receive signatures and/or receive and send messages to the identity verification token and the verifier

1016. The identity registrar may also have storage capabilities and may store information in a data store 1024 sufficient to verify signatures, including one or more of document identifiers, proofs of credentials of users, identity verification token numbers, signatory identifiers, timestamps, and signatures. Proofs of consenting credentials 1010 or duress credentials 1030 may be any information sufficient to verify that the corresponding user has possession of the corresponding credentials. These proofs may be a hash of the consenting credentials 1010 or the duress credentials 1030 (e.g., password or biometric data), encrypted credentials, or the consenting credentials 1010 or duress credentials 1030 themselves.

As an example of verification, the document 104 or a copy of the document 104 may be provided to the verifier 1016 along with the signatory identifier 1028, and the verifier 1016 may determine the document identifier 1006 from the document 104. In some cases, if the document 104 is a physical document, the document identifier 1006 of the document 104 may be generated based on an optical scan (e.g., digital image or optical character recognition scan) of the document 104. The verifier may then provide the determined document identifier 1006 and the signatory identifier 1028 to the identity registrar 414 for verification. Alternatively, the verifier 1016 may provide the scan of the document 104, as a digital image or as an optical character recognition scan of the document 104, and provide that data with the signatory identifier 1028 to the identity registrar 1014. The identity registrar 1014 may then determine the document identifier 1006 from the optical scan data for the purposes of verifying whether or how the user corresponding to the signatory identifier 1028 signed the document 104.

The verifier 1016, upon obtaining the document identifier 406 and the signatory identifier 1028 of the user, the verifier 416 may provide the document identifier 1006 and the signatory identifier 1028 to the identity registrar 1014. The identity registrar 1014 may then look up the signatory identifier 1028 in the data store 1024 to retrieve a signature 1012, the consenting credentials 1010, the duress credentials 1030, or proofs of the respective credentials, the identity verification token number 1020, and, in some cases, the timestamp 1022 associated with the signature event. The identity registrar 1014 may then process the document identifier 1006, the consenting credentials 1010 or proof of the consenting credentials, and the identity verification token number 1020 in the same manner as the signature 912 would have been generated (e.g., running the data through a cryptologic hash algorithm). If a first result 1026 of the processing matches the signature 1012, then a confirmation message 1040A, indicating that the document 104 (e.g., the required loan application document) was indeed signed by the applicant without duress, and was signed at the time indicated by the timestamp 1022, may be provided to the verifier 1016 or other authorized requesting entity.

On the other hand, if the first result 1026 of the processing did not match the signature 1012, the identity registrar 1014 may determine whether the document 104 was signed using the duress credentials 930. To perform this determination, the identity registrar 1014 may process the document identifier 1006, the duress credentials 1030 or proof of the duress credentials, and the identity verification token number 1020 in the same manner as the duress signature 934 would have been generated (e.g., running the data through a cryptologic hash algorithm). If a second result 1036 of the processing matches the signature 1012, then a confirmation message 1040B, indicating that the document 104 (e.g., the required loan application document) was indeed signed by the applicant under duress, and was signed at the time indicated by the timestamp 1022, may be provided to the verifier 1016 or other authorized requesting entity. On the other hand, if the signature matched neither the first result 1026 nor the second result 1036, the confirmation message 1040B may be provided to include notice that either document 104 presented is invalid or that the user associated with the signatory identifier did not sign the document 104.

Figure 11:
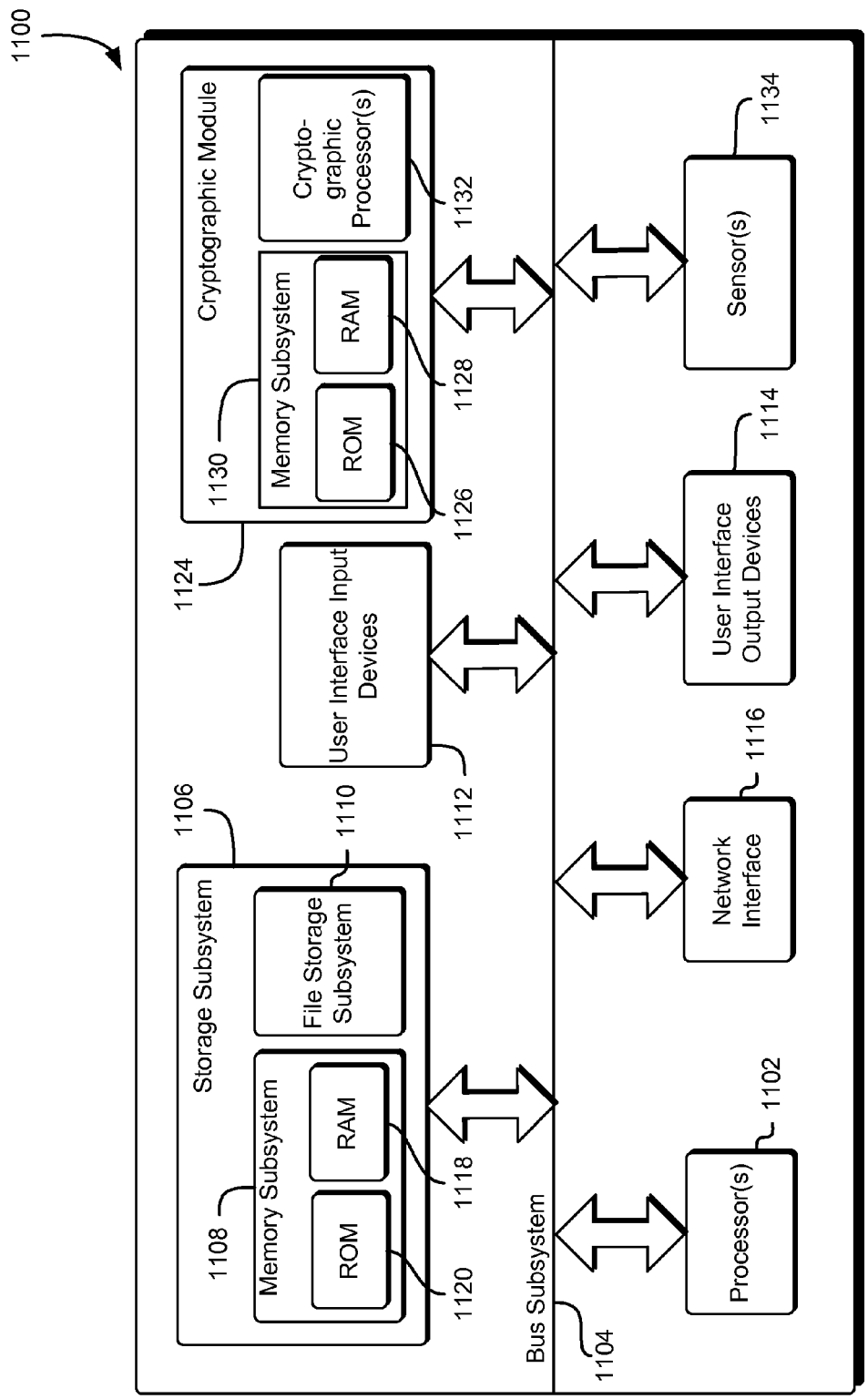
FIG. 11 illustrates an example of an identity verification token in accordance with an embodiment.

FIG. 11 is an illustrative, simplified block diagram of an example device system 1100 that may be used as an identity verification token in at least one embodiment of the present disclosure. In various embodiments, the device system 1100 may be used to implement any of the systems illustrated herein and described above. For example, the device system 1100 may be used to implement a support application in accordance with various embodiments. As shown in FIG. 11, the device 1100 may include one or more processors 1102 that may be configured to communicate with and are operatively coupled to a number of peripheral subsystems via a bus subsystem 1104. These peripheral subsystems may include a storage subsystem 1106, comprising a memory subsystem 1108 and a file storage subsystem 1110, one or more user interface input devices 1112, one or more user interface output devices 1114, a network interface subsystem 1116, a cryptographic module 1124, comprising a memory subsystem 1130 and one or more cryptographic processors 1132. The peripheral subsystems may also include one or more sensors 1134 in addition to sensors of input devices 1112. Such sensors may include, but are not limited to, GPS sensors, accelerometers, temperature sensors and others.

The bus subsystem 1104 may provide a mechanism for enabling the various components and subsystems of device system 1100 to communicate with each other as intended. Although the bus subsystem 1104 is shown schematically as a single bus, alternative embodiments of the bus subsystem may utilize multiple busses.

The network interface subsystem 1116 may provide an interface to other device systems and networks. The network interface subsystem 1116 may serve as an interface for receiving data from and transmitting data to other systems from the device system 1100. For example, the network interface subsystem 1116 may enable transmission of a video stream and other information, such as electronic requests to access a system (e.g., receive a webpage) and may enable receipt of responses to the requests, such as webpages or other information. The network interface subsystem 1116 may also facilitate the receipt and/or transmission of data on other networks, such as an organization's intranet and/or other networks described below.

The network interface subsystem 1116 may provide an interface to other device systems and networks. The network interface subsystem 1116 may serve as an interface for receiving data from and transmitting data to other systems from the device system 1100. For example, the network interface subsystem 1116 may enable transmission of a video stream and other information, such as electronic requests to access a system (e.g., receive a webpage) and may enable receipt of responses to the requests, such as webpages or other information. The network interface subsystem 1116 may also facilitate the receipt and/or transmission of data on other networks, such as an organization's intranet and/or other networks described below.

The user interface input devices 1112 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices include devices usable to obtain information from other devices, such as long-term or short-term credentials for use in generating a support session, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 1100.

User interface output devices 1114, if any, may include a display subsystem, a printer or non-visual displays, such as audio and/or tactile output devices, etc. Generally, the output devices 1114 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 1100. The output device(s) 1114 may be used, for example, to present user interfaces to facilitate user interaction with applications performing processes described herein and variations therein, when such interaction may be appropriate. While a device 1100 with user interface output devices is used for the purpose of illustration, it should be noted that the device 1100 may operate without an output device, such as when the device 1100 is operated in a server rack and, during typical operation, an output device is not needed.

The storage subsystem 1106 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, and may be stored in the storage subsystem 1106. These application modules or instructions may be executed by the one or more processors 1102. The storage subsystem 1106 may additionally provide a repository for storing data used in accordance with the present disclosure. The storage subsystem 1106 may comprise a memory subsystem 1108 and a file/disk storage subsystem 1110.

The cryptographic module 1124, which may be a trusted platform module (TPM), includes a memory subsystem 1130, including a main random access memory (RAM) 1128 for storage of instructions and data during program execution and a read only memory (ROM) 1126, in which fixed cryptographic information may be stored, such as a hardware secret stored securely within the device 1100 so as to be non-exportable (i.e., inaccessible through any call to the cryptographic module 1124). The cryptographic module 1124, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1100 may also store cryptographic keys in RAM 1128 and/or processor registers for temporary cryptographic processing. The cryptographic information stored in memory may be used in combination with cryptographic information obtained via the network interface 1116 and/or one or more of the user interface input devices 1112. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, Blowfish, CASTS, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1124 may be configured to collectively perform various operations used for generating cryptographically verifiable information for security tasks.

As noted above, in various embodiments of the present disclosure, in some embodiments an identity verification token number of the device system 1100 may be stored within the memory subsystem 1130 of the cryptographic module 1124. In such embodiments, the identity verification token number, before being provided to an identity registrar, is encrypted using a private key of the one or more cryptographic processor 1132. Upon receipt of the encrypted identity verification token number, the identity registrar may decrypt the identity verification token number using a corresponding public key provided to the identity registrar by the device system 1100. In some embodiments, the identity verification token is a set of software instructions configured to reside in the memory subsystem 1130 and be executed by the one or more cryptographic processors 1132

Figure 12:
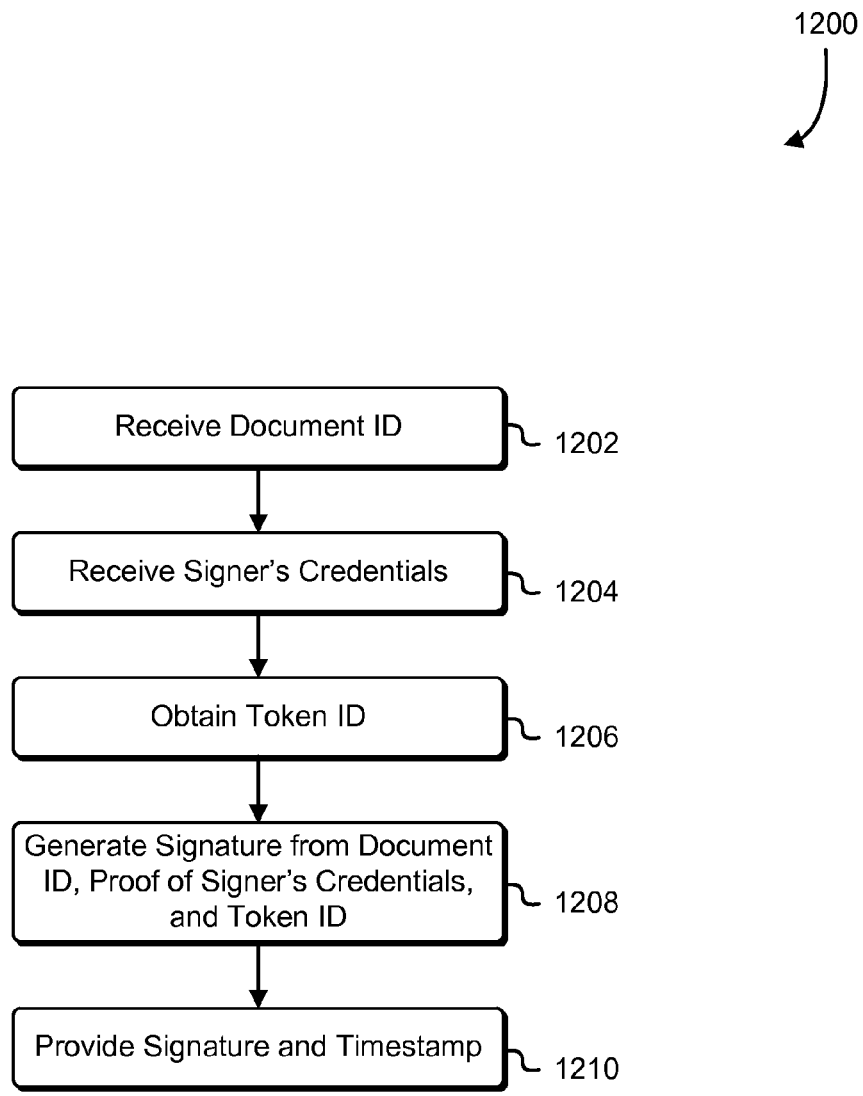
FIG. 12 is a block diagram that illustrates an example of signing a document using an identity verification token in accordance with an embodiment.

FIG. 12 is a block diagram illustrating an example of a process 1200 for generating a signature in accordance with various embodiments. The process 1200 may be performed by any suitable system such as a mobile phone, tablet computing device, laptop computer, electronic key fob, or any electronic client device such as the electronic client device 1502 described in conjunction with FIG. 15. The process 1200 includes a series of operations wherein an identity verification token receives a document identifier and some proof of the signatory's credentials, and generates a signature based on this data and the identity verification token's identity verification token number.

In 1202, the identity verification token may receive a document identifier representing the document in question being signed. In some embodiments, the document identifier is generated by scanning the document in question, passing the scanned data through a cryptographic hash algorithm, and using the hash result as the document identifier. In other embodiments, the document identifier is generated by an identity registrar, such as in a way that ensures that the chance of the same identifier being generated for different documents is eliminated or minimized. The document identifier need not be directly presented to the identity verification token from the identity registrar. For example, the document identifier may have been provided to the document provider by the identity registrar, whereupon the document provider may provide the identifier to the signatory, such as through an e-mail, a web page, or a printed, optically scannable code, such as quick response code.

In 1204, the signatory enters his/her password into the identity verification token. Additionally or alternatively, other information sufficient to identify the signatory may be used as credentials, such as fingerprint, voice recognition, or other biometric data. In 1206, the identity verification token obtains its identity verification token number. As noted, the identity verification token number may be a unique identifier that identifies the device being used as the identity verification token. In some embodiments, the identity verification token number is not accessible by the user of the identity verification token. For example, the identity verification token number may be hardware protected by a Trusted Platform Module or Intel Software Guard eXtensions.

In 1208, the signature may be generated. In some embodiments, the signature is generated by hashing the document identifier, the signatory's credentials or proof of credentials (e.g., a hash of the signatory's password), and the identity verification token number of the identity verification token. In some embodiments, the parameters for generating the signature also includes other data, such as a timestamp for the signing and/or global positioning system coordinates of the location of the signing event.

In 1210, the signature generated by the operations of 1208 and the timestamp of the time of the signing may be provided to the identity registrar and/or other entities. The identity registrar may store the signature and/or other data obtained at the time of signing, such as the timestamp. The identity registrar may store the data that the digital signature, and what (e.g., the document) was signed, who (the signatories, the merchant, etc.) was present, where the signing occurred, when (e.g., timestamp) the signing occurred, and how (e.g., the identity verification token) the document was signed may be later verified. In some embodiments, the signature is provided by the identity verification token with a digital signature using key provided by a trusted certificate registrar. This may provide an additional layer of security to show that the identity verification token may be trusted. Note that one or more of the operations performed in 1202-10 may be performed in various orders and combinations, including in parallel.

Figure 13:
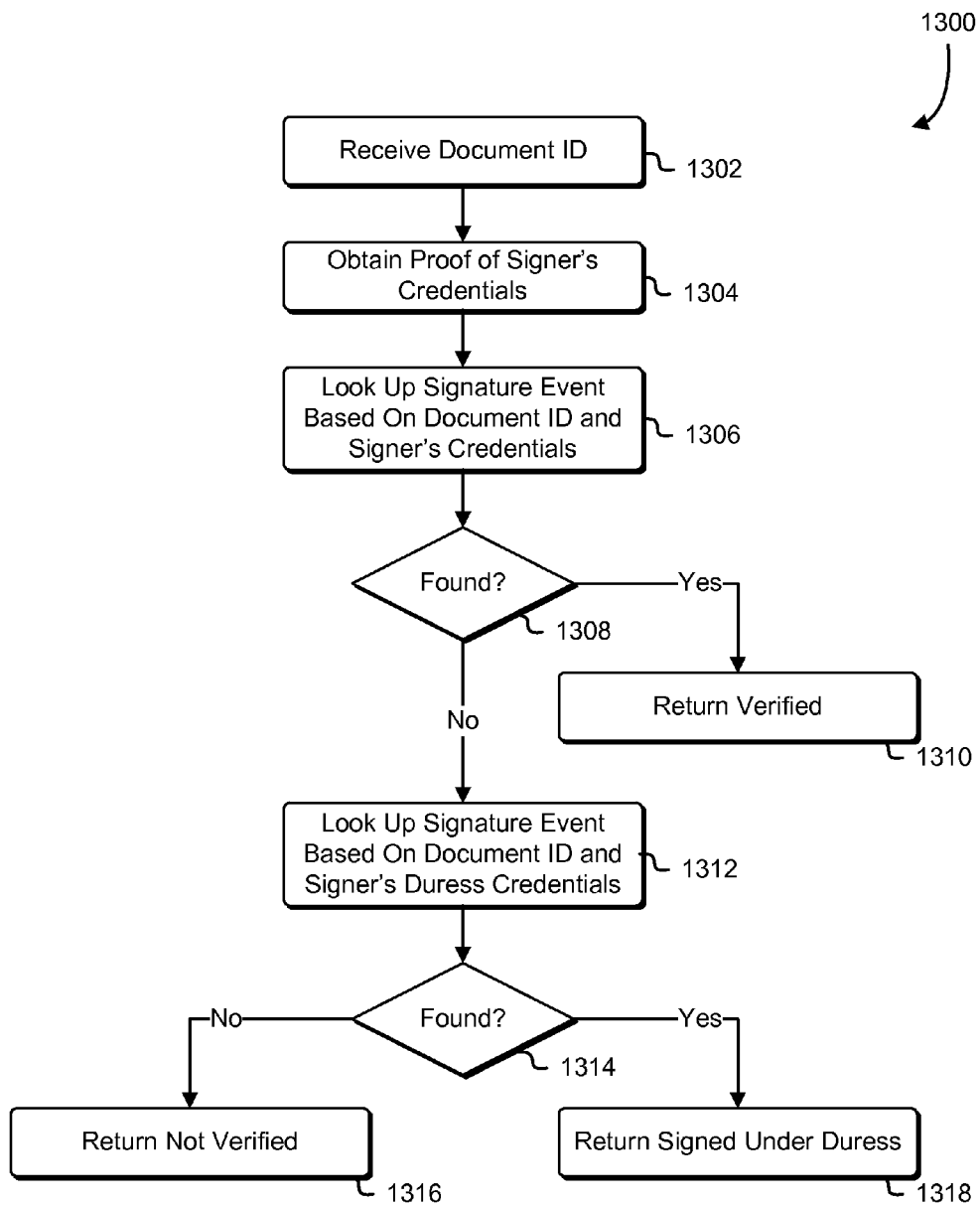
FIG. 13 is a flow chart that illustrates an example of verifying a signature in accordance with an embodiment.

FIG. 13 is a flow chart illustrating an example of a process 1300 for verifying a signature in accordance with various embodiments. The process 1300 may be performed by any suitable system acting as a signature verifier such as an electronic cash register or other electronic checkout station, mobile phone, tablet computing device, laptop computer, electronic key fob, or any electronic client device such as the electronic client device 1502 described in conjunction with FIG. 15. The process 1300 includes a series of operations wherein a document identifier is received, the signatory's credentials are entered, and the signature is verified, not verified, or verified as being signed under duress.

In 1302, a verifier may receive a document identifier representing the document in question that was purportedly signed. As noted, in some embodiments, the document identifier is generated by scanning the document in question, passing the scanned data through a cryptographic hash algorithm, and using the hash result as the document identifier. In other embodiments, the document identifier is generated by an identity registrar, such as in a way that ensures that the chance of the same identifier being generated for different documents is eliminated or minimized. The document identifier need not be directly presented to the verifier from the identity registrar. As an example, an investigator may present the verifier with a document or document identifier to seek whether the corresponding document was indeed signed by a particular signatory.

In 1304, the verifier may obtain proof of the particular signatory's credentials. Depending on the situation, in some cases this proof may be obtained by the signatory entering his/her password or other credentials through an interface of the verifier. In other cases a third party, such as in the aforementioned example, may provide the signatory's signatory identifier or other identification whereby the verifier may be able to retrieve the proof of the signatory's credentials from a data store of the identity registrar.

In 1306, the verifier may request data corresponding to the signature event based on the obtained credentials from the identity registrar. In 1308, if the identity registrar responds with data or the confirmation of the signature, the verifier may proceed to 1310 and respond to the requestor that the particular signatory did indeed sign the document indicated by the document identifier. The verifier may also respond with additional information provided by the identity registrar, such as a timestamp and/or global positioning system location information regarding the signature event.

However, if the identity registrar is unable to find a signature corresponding to the document identifier and the proof of the signatory's credentials, the verifier may proceed to 1312 to obtain proof of the signatory's duress credentials. The duress credentials, if matched to the signature, may indicate that the signatory signed the document unwillingly. The proof of the signatory's duress credentials may be obtained in a similar manner to how the proof of the credentials were obtained; e.g., by providing the signatory's signatory identifier or other identification whereby the verifier may be able to retrieve the proof of the signatory's duress credentials from a data store of the identity registrar.

The verifier may then submit a request to the identity registrar for data corresponding to a signature event based on the signatory's duress credentials (if obtained). In 1314, if duress credentials for the signatory were not found or if data corresponding to a signing using the signatory's duress credentials were not found by the identity registrar, the verifier may proceed to 1316, whereupon the verifier may respond that no signature corresponding to the document identifier and the signatory could be found. Otherwise, if a duress signature was confirmed, the verifier may proceed to 1318 whereupon the verifier may respond that the document corresponding to the document identifier was signed unwillingly by the signatory.

Note that the verifier proceeding to 1318 may also be dependent upon the nature of the identifier or the identity of the entity requesting verification. For example, in the event that the signer is being forced to complete a transaction, such as a credit card purchase, if the merchant performing the signature verification is notified that the signature was made under duress, it may place the signatory and/or the merchant in danger (e.g., if the person forcing the signing is also present). In such a case, the operations of 1318 may indicate that the signature was simply verified as valid. However, for other entities, such as an investigator or credit card company, the signature may be shown to have been made under duress. As another example, if the document being signed is a will, the testator signing under duress may sign using the testator's duress credentials, and, to all parties present at the signing, the duress signature may be verified as a valid signature. However, during probate, an authorized entity may be able to verify that the will was signed using the testator's duress credentials. Note too, that one or more of the operations performed in 1302-18 may be performed in various orders and combinations, including in parallel.

Figure 14:
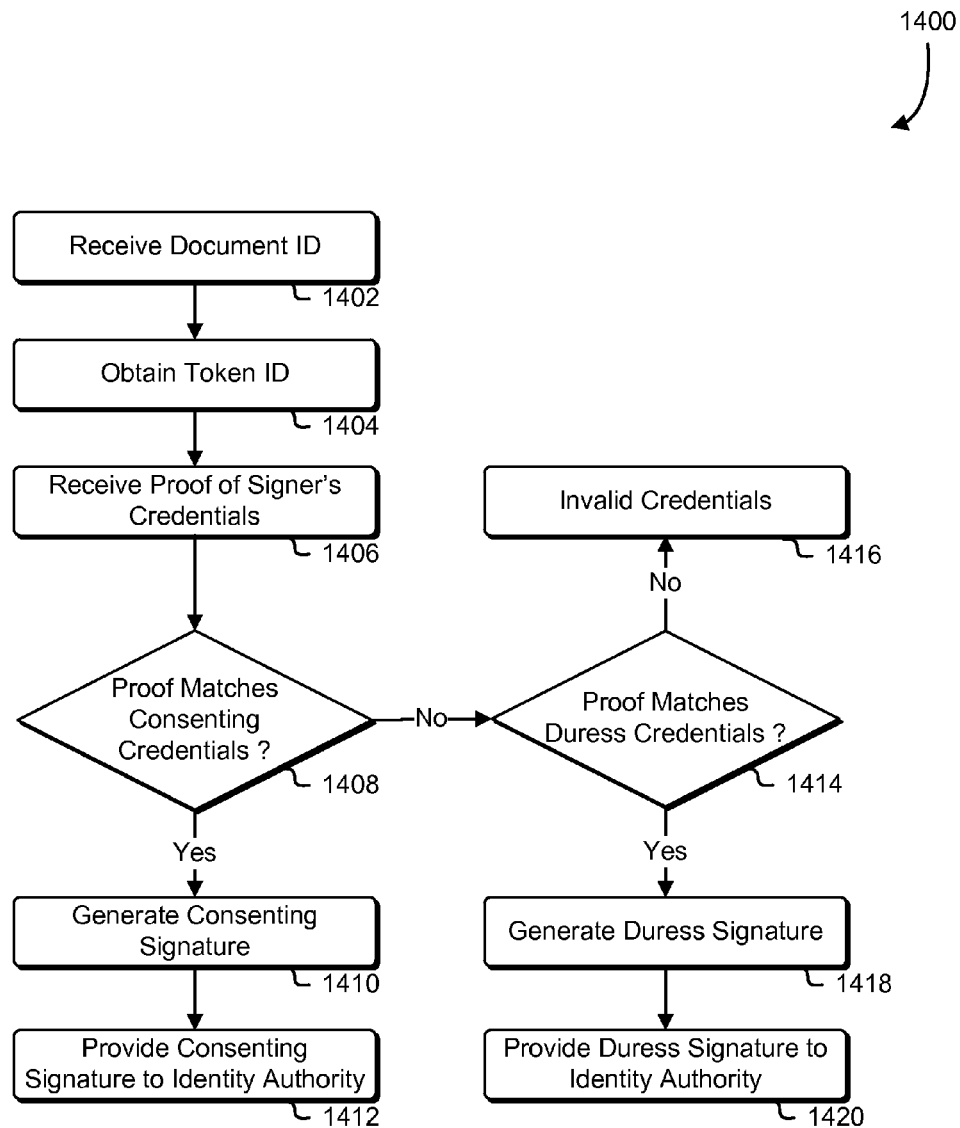
FIG. 14 is a flow chart that illustrates an example of receiving duress credentials and generating a duress signature in accordance with an embodiment.

FIG. 14 is a flow chart illustrating an example of a process 1400 for receiving a duress credentials and generating a duress signature in accordance with various embodiments. The process 1400 may be performed by any suitable system such as a mobile phone, tablet computing device, laptop computer, electronic key fob, or any electronic client device such as the electronic client device 1502 described in conjunction with FIG. 15. The process 1400 includes a series of operations wherein a document identifier, as identity verification token number, and some proof of the signatory's credentials. The based on the credentials, the system performing the process may generate a consenting signature or a duress signature based on this data.

In 1402, an identity verification token may receive a document identifier representing the document in question being signed. As noted, in some embodiments, the document identifier is generated by scanning the document in question, passing the scanned data through a cryptographic hash algorithm, and using the hash result as the document identifier. In other embodiments, the document identifier is generated by an identity registrar, such as in such a manner minimizes the chance of the same identifier being generated for different documents. The document identifier need not be directly presented to the identity verification token from the identity registrar. For example, the document identifier may have been provided to the document provider by the identity registrar, whereupon the document provider may provide the identifier to the signatory, such as through an e-mail, a web page, or a printed quick response code.

In 1404, the identity verification token may obtain its identity verification token number. As noted, the identity verification token number may be a unique identifier that identifies the device (i.e., the identity verification token) being used to an identity registrar as the identity verification token. As noted, in some implementations the identity verification token number may be a private key of a public-private cryptographic scheme where the identity registrar may have a corresponding pubic key. In some of these implementations, output from the identity verification token may be encrypted and/or digitally signed using the identity verification token number, and subsequently decrypted and/or verified using the corresponding public key of the identity registrar.

In 1406, the signatory enters his/her password into the identity verification token. Additionally or alternatively, other information sufficient to identify the signatory may be used as credentials, such as fingerprint, voice recognition, or other biometric data. As noted, in some embodiments, the identity verification token is configured to detect and recognize various cues from biometric data suggestive of being under duress, such as sweating, rapid heart rate, gait, breathing pattern changes, pupil dilation, etc. In some implementations, such data may be obtained at the time the signatory enters his/her credentials. In other implementations, such data may be obtained at any stage of the process 1400, such as when making the determinations of 1414.

In 1408, the system performing the process 1400 determines whether the credentials input by the signatory matches the consenting credentials (that is, the credentials normally used by the signatory for signatures). If the credentials that were input are a match to the consenting credentials, then the system performing the process 1400 may proceed to 1410 to generate the consenting signature. Otherwise, if the credentials that were input in 1406 do not match the consenting credentials, the system performing the process 1400 may proceed to 1414 to determine if the credentials that were input in 1406 are a match to the duress credentials the signatory may have established with the identity registrar.

In 1410, the consenting signature may be generated. In some examples, the consenting signature may refer to a signature that indicates that the signatory has signed the document in question without duress being involved. In some embodiments, the consenting signature is generated by hashing the document identifier, the signatory's consenting credentials or proof of consenting credentials (e.g., a hash of the signatory's consenting password), and the identity verification token number of the identity verification token. In some embodiments, the parameters for generating the consenting signature may include other data, such as global positioning system coordinates of the location of the signing event, and/or duress confidence score.

In 1412, the consenting signature generated by the operations of 1410 and the timestamp of the time of the signing may be provided to the identity registrar and/or other entities. The identity registrar may store the consenting signature and/or other data obtained at the time of signing, such as the timestamp. The identity registrar may store the data such that the consenting signature, and what (e.g., the document) was signed, who (the signatories, the merchant, etc.) was present, where the signing occurred, when (e.g., timestamp) the signing occurred, and how (e.g., the identity verification token) the document was signed may be later verified. As noted, in some embodiments, the consenting signature is provided with a digital signature from the identity verification token signed using a key provided by a trusted certificate authority. This may provide an additional layer of security to show that the identity verification token may be trusted.

In 1414, the system performing the process 1400 may determine whether the credentials that were input in 1406 correspond to duress credentials. In some examples, the duress credentials may refer to a set of credentials the signatory may have registered with the identity registrar that, if used, would indicate that the signatory is signing under duress. As noted, duress may refer to a situation whereby a signatory signs under threat or coercion, and may also include signing under protest or otherwise unwillingly. If the credentials input in 1406 are not a match to either the consenting credentials or the duress credentials, the system performing the process 1400 may determine that the credentials entered were invalid or entered incorrectly and proceed to 1416. In 1416, the system performing the process may respond to the signatory, such as by popping up an error message on a screen of the identity verification token, that the credentials entered in 1406 could not be found and that the signatory should try again or contact the identity registrar for troubleshooting (e.g., if the signatory forgot his/her password). In some cases, repeated failed attempts to enter credentials may cause the identity verification token to temporarily lock out users, disable itself, or notify the identity registrar of the failed attempts.

Otherwise, if the credentials entered in 1406 are a match to the duress credentials, the signatory has indicated that he/she is signing under duress. In such a situation, in 1418, the system performing the process 1418 may generate a duress signature to reflect this. In some embodiments, the duress signature is generated by hashing the document identifier, the signatory's duress credentials or proof of duress credentials (e.g., a hash of the signatory's duress password), and the identity verification token number of the identity verification token. In some embodiments, the parameters for generating the duress signature also includes other data, such as global positioning system coordinates of the location of the signing event and/or a duress confidence score.

In 1420, the duress signature generated by the operations of 1418 and the timestamp of the time of the signing may be provided to the identity registrar and/or other entities. The identity registrar may store the duress signature and/or other data obtained at the time of signing, such as the timestamp. The identity registrar may store the data such that the duress signature, and what (e.g., the document) was signed, who (the signatories, the merchant, etc.) was present, where the signing occurred, when (e.g., timestamp) the signing occurred, and how (e.g., the identity verification token) the document was signed under duress may be later verified. As noted, in some embodiments, the duress signature is provided with a digital signature from the identity verification token signed using a key provided by a trusted certificate registrar. This may provide an additional layer of security to show that the identity verification token may be trusted. Note that one or more of the operations performed in 1402-20 may be performed in various orders and combinations, including in parallel.

In an alternate embodiment, the identity verification token is issued two or more different private keys (in other words, the identity verification token number may in this embodiment be a set of private keys), each of which are of a public-private key pair with the identity registrar having corresponding public keys in its possession. Each private key may be associated with a different purpose, as described in the present disclosure. For example, a consenting private key may be associated with consenting credentials and a duress private key may be associated with duress credentials. In the embodiment, if the signatory uses the consenting credentials to sign into the identity verification token, the signature is generated using or based on the consenting private key. Conversely, if the signatory uses the duress credentials to sign into the identity verification token, the signature is generated using or based on the duress private key. In this manner, the identity registrar may determine whether the signature was signed under duress or not based on which corresponding public key the identity registrar is able to use for verifying the signature. The identity registrar may keep secret which public key was used to generate or verify the signature, except to certain authorized entities (e.g., law enforcement, etc.). In this manner, a verifier or an entity like the antagonist 928 of FIG. 9, may be unable to ascertain that the signature was generated using the duress private key. Such verifier or entity may only receive confirmation from the identity authority that the signature was verified.

Note also that in some embodiments, biometric data is additionally captured and may factor into a determination by the system whether the signatory is under duress or in some other biometric state. For example, the operations of 1414 may instead be performed if the credentials input in 1406 match the consenting credentials. That is, biometric data may be used by the system to generate a duress confidence score reflecting a probability whether the signature entered the credentials under duress. In some cases, biometric data or values derived from the biometric data, such as the duress confidence score, may be used as additional parameters in generating the signature. In other cases, such data or values may be provided to the identity registrar in conjunction with providing the signature.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 15:
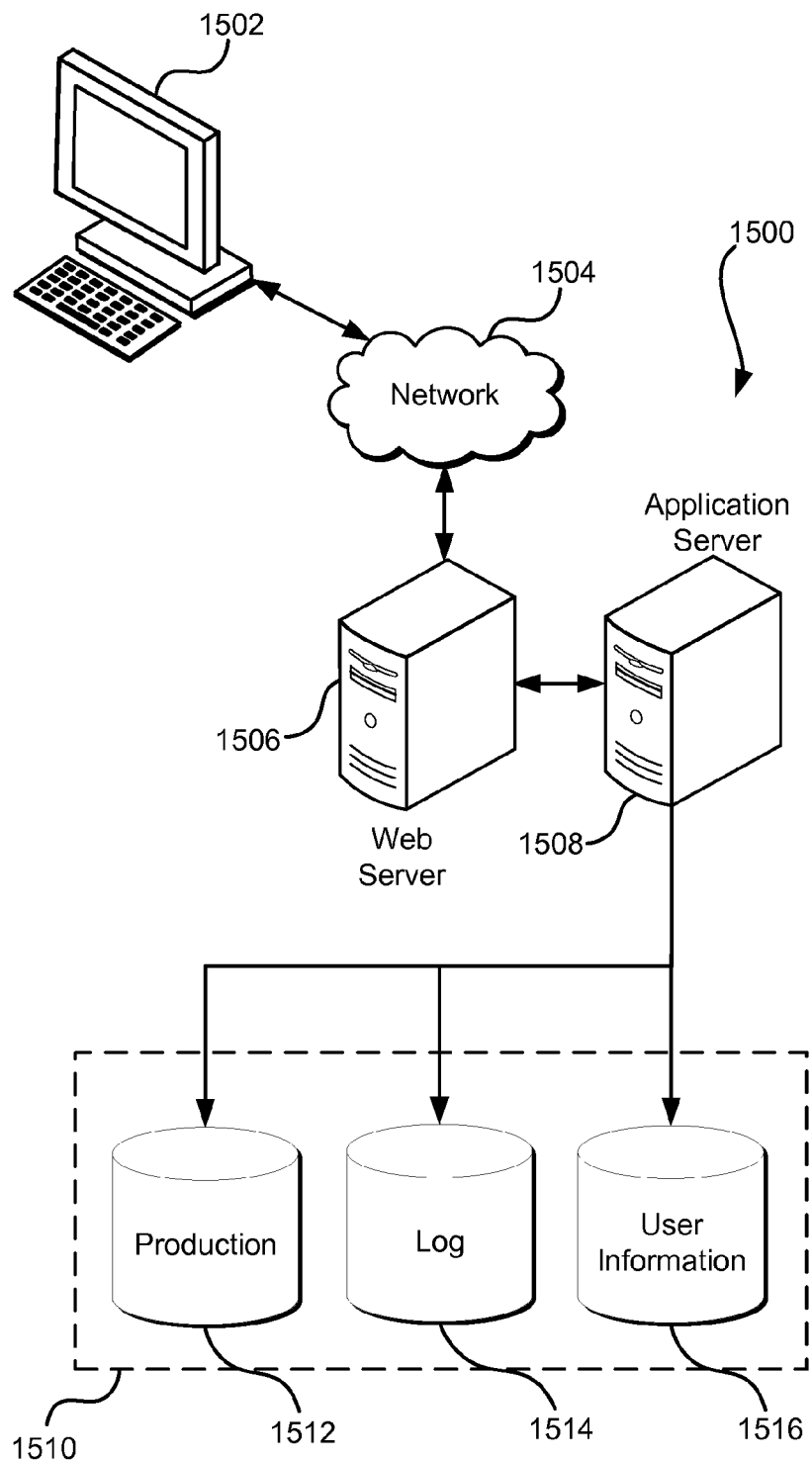
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes an application server 1508 and a data store 1510. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the electronic client device 1502 and the application server 1508, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the example environment 1500 in FIG. 15 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

Embodiments of the disclosure can be described in view of the following clauses:

1. A computer-implemented method, comprising:
 under the control of one or more computer systems configured with executable instructions,
  obtaining, at an identity verification token of a signatory, a document identifier for identifying a document, wherein the identity verification token is a device registered with an identity registrar and authorized by the identity registrar to generate a signature, and wherein the document identifier was previously generated in response to a requesting party requesting the document identifier based at least in part on a transaction being performed between the requesting party and a user of the identity verification token;
  receiving, at the identity verification token of the signatory, a password and biometric input of a signatory;
  obtaining, at the identity verification token of the signatory, an identity verification identifier for identifying the identity verification token;
  obtaining, at the identity verification token of the signatory, a timestamp;
  generating a signature based at least in part on the document identifier, the password and biometric input, and the identity verification identifier; and
  providing at least the signature to one or more of an identity registrar, a merchant, or another identity verification token.

2. The computer-implemented method of clause 1, wherein the one or more of the password or the biometric input indicate that the signatory is signing under duress, wherein indications of duress include one or more of use of a duress password, use of a fingerprint predetermined to indicated duress, physiological biometric data indicating that the signatory is under duress, or behavioral biometric data indicating that the signatory is under duress.

3. The computer-implemented method of clause 1 or 2, wherein generating the signature comprises at least passing the document identifier, the password and biometric input through one or more cryptographic hash algorithms.

4. The computer-implemented method of any of clauses 1 to 3, wherein the signatory is a first signatory, the credentials are a first credentials, the signature is a first signature, and the method further comprises:
receiving second credentials of a second signatory, wherein the second credentials indicate a presence of the second signatory;
generating a second signature based at least in part on the document identifier, the second credentials, and the identity verification identifier; and
providing at least the second signature.

5. The computer-implemented method of clause 4, wherein the first signatory is an individual and the second signatory is a set of software instructions executing on a computer system.

6. A system, comprising:
at least one computing device configured to implement one or more services, wherein the one or more services are configured to:
receive a request from a requestor to verify a signatory to a document;
obtain:
   a document identifier for the document;
   a signatory identifier, wherein the signatory identifier identifies the signatory to an identity registrar;
   a set of credential data corresponding to the signatory identifier;
   a token identifier; and
   a first signature corresponding to the document identifier; and
generate a second signature based at least in part on the document identifier, a subset of the set of the credential data, and the token identifier;
determine a result based at least in part on a match between the first signature and the second signature; and
provide the result to the requestor.

7. The system of clause 6, wherein the subset of the set of credential data is a first subset of the set of credential data and wherein the one or more services that are configured to determine the result are further configured to:
determine that the first signature does not match the second signature;
generate a third signature based at least in part on the document identifier, a second subset of the set of credential data, and the token identifier, wherein the second subset of the set of credential data is different than the first subset and is indicative of signing under duress; and
determine the result based at least in part on a comparison of the first signature with the third signature.

8. The system of clause 6 or 7, wherein the request is a second request and the one or more services are further configured to:
receive a first request to generate the document identifier, wherein the first request includes a copy of the document; and
in response to receiving the first request:
generate the document identifier based at least in part on the copy of the document; and
provide the document identifier.

9. The system of any of clauses 6 to 8, wherein the subset of the set of credential data is a first subset of the set of credential data and wherein the one or more services that are configured to determine the result are further configured to:
determine that the first signature does not match the second signature;
generate a third signature based at least in part on the document identifier, a second subset of the set of credential data different than the first subset, and the token identifier; and
determine the result based at least in part on a comparison of the first signature with the third signature.

10. The system of any of clauses 6 to 9, wherein the one or more services execute within a hardware-secured execution environment.

11. The system of any of clauses 6 to 10, wherein the request is a second request and the one or more services are further configured to:
receive a first request from an identity verification token to verify the document, wherein the first request includes the document identifier; and
in response to receiving the first request:
based at least in part on the document identifier, obtain a copy of the document from a data store of the identity registrar; and
provide the copy of the document to the identity verification token.

12. The system of any of clauses 6 to 11, wherein the request is a second request, the document identifier is a first document identifier, and the one or more services are further configured to:
receive a first request from an identity verification token to verify the document identifier, wherein the first request includes a copy of the document; and
in response to receiving the first request:
based at least in part on the copy of the document, generate a second document identifier; and
provide the second document identifier to the identity verification token.

13. The system of any of clauses 6 to 12, wherein the request is received through an application programming interface provided by the identity registrar.

14. A non-transitory computer-readable storage medium having stored thereon executable instructions that, when executed by one or more processors of a computer system, cause the computer system to at least:
receive a request to generate a signature for a document in response to a requestor requesting generation of the signature, wherein the request includes an indication of acceptable credentials for signing;
obtain a document identifier, wherein the document identifier identifies the document to a service provider;
obtain a token identifier, wherein the token identifier identifies a token to the service provider;
generate the signature based at least in part on the document identifier, a set of credentials selected by a signatory, and the token identifier; and
provide the signature to the requestor.

15. The non-transitory computer-readable storage medium of clause 14, wherein the set of credentials selected by the signatory are indicative of the signature signing under duress.

16. The non-transitory computer-readable storage medium of clause 14 or 15, wherein the set of credentials selected by the signatory is a first set of credentials selected by a first signatory, the token identifier is a first token identifier, the token is a first token, the signature is a first signature, the instructions that cause the computer system to provide the signature to the requestor further cause the computer system to provide the first signature to a second token, and the instructions further include instructions that, when executed by the one or more processors, cause the computer system to:

receive a second set of credentials from a second signatory;

obtain a second token identifier, wherein the second token identifier identifies the second token to the service provider;

generate, at the second token, a second signature based at least in part on the document identifier, the first signature, the second set of credentials, and the second token identifier; and provide the second signature to the service provider.

17. The non-transitory computer-readable storage medium of any of clauses 14 to 16, wherein a copy of the document is provided to the service provider and the document identifier is generated by the service provider from contents of the copy of the document and a seed.

18. The non-transitory computer-readable storage medium of any of clauses 14 to 17, wherein the token identifier is held within a hardware-secured execution environment of the token.

19. The non-transitory computer-readable storage medium of any of clauses 14 to 18, wherein the instructions that cause the computer system to generate the signature include instructions that cause the computer system to generate the signature based at least in part on a cryptographic hash result of the document identifier, the set of credentials, and the token identifier.

20. The non-transitory computer-readable storage medium of any of clauses 14 to 19, wherein the token identifier is a private key of a public-private key scheme and the instructions that cause the computer system to generate the signature include instructions that, when executed by one or more processors of a computer system, cause the computer system to generate the signature based at least in part on encrypting the document identifier using the token identifier.

21. The non-transitory computer-readable storage medium of any of clauses 14 to 20, wherein the document identifier is obtained by scanning an optically scannable code.

22. The non-transitory computer-readable storage medium of any of clauses 14 to 21, wherein the signature is provided by imprinting the signature onto a physical object.

23. A computer-implemented method, comprising:

under the control of one or more computer systems configured with executable instructions, receiving a signature of a signatory, wherein the signatory is associated with a first set of credential data and a second set of credential data, wherein the first set of credential data is associated with a first duress level, and wherein the second set of credential data is associated with a second duress level;

receiving a document identifier for identifying a document;

obtaining an identity verification identifier for identifying an identity verification token, wherein the identity verification token is registered with an identity registrar and authorized by the identity registrar to generate signatures;

generating a first signature based at least in part on the document identifier, the first set of credential data, and the identity verification identifier;

determining that the generated first signature is not a match to the received signature of the signatory;

generating a second signature based at least in part on the document identifier, the second set of credential data, and the identity verification identifier;

determining that the generated second signature is a match to the received signature of the signatory; and performing an action in accordance with the second duress level, wherein the action is one or more of hiding information associated with a first account, displaying information associated with a second account, notifying security personnel of a security incident indicated by the second duress level, sending a message indicating an occurrence of the second duress level, indicating the occurrence of the second duress level in a data store, or repudiating transactions associated with the document.

24. The computer-implemented method of clause 23, wherein the second set of credentials is associated with a signing event where the signatory signed the document unwillingly, and wherein determining that the generated second signature is a match to the received signature is an indication that the signatory signed the document unwillingly.

25. The computer-implemented method of clause 23 or 24, wherein the identity verification identifier is a first private key of a public-private key scheme and a second private key of a public-private key scheme, generating the first signature includes generating the signature based at least in part on encrypting the document identifier using the first private key, and generating the second signature includes generating the second signature based at least in part on the encrypting the document identifier using the second private key.

26. The computer-implemented method of any of clauses 23 to 25, wherein the first set of credential data includes a first duress confidence score and the second set of credential data includes a second duress confidence score, wherein the second duress confidence score indicates a greater likelihood than the first duress confidence score of the signature having been made under duress.

27. A system, comprising:

at least one computing device configured to implement one or more services, wherein the one or more services are configured to:

receive a request to generate a signature for a document in response to a requestor requesting generation of the signature, wherein the request includes an indication of acceptable credentials for signing;

obtain a document identifier for the document;

obtain a token identifier for the at least one computing device;

determine a set of credentials from multiple sets of credentials associated with a signatory wherein the set of credentials is selected by the signatory; and generate the signature based at least in part on the document identifier, the set of credentials, and the token identifier such that the generated signature is verifiable as corresponding to the determined set of credentials.

28. The system of clause 27, wherein the token identifier is a private key of a public-private key scheme and the one or more services that are configured to generate the signature are configured to generate the signature based at least in part on encrypting the document identifier using the token identifier.

29. The system of clause 27 or 28, wherein at least one set of credentials from the multiple sets of credentials is a set of duress credentials that, when selected by the signatory, causes a duress signature to be generated.

30. The system of any of clauses 27 to 29, wherein the one or more services are further configured to request, from the signatory, a credential from the multiple sets of credentials to use as part of the signature.

31. The system of any of clauses 27 to 30, wherein the multiple sets of credentials include multiple sets of biometric data associated with the signatory, wherein at least one set of the multiple sets of biometric data includes one or more of fingerprint data or finger movement data that indicates an occurrence of a sanctioned signing event, and at least another set of biometric data includes one or more of fingerprint data or finger movement data that indicates an occurrence of an unsanctioned signing event.

32. The system of any of clauses 27 to 31, wherein the at least one computing device includes sensors capable of measuring one or more of a heart rate, an amount of pupil dilation, body temperature, an amount of sweat, and blood pressure of the signatory.

33. The system of any of clauses 27 to 32, wherein:
the set of credentials includes a location of a signing event corresponding to the signature;
the set of credentials includes a set of criteria for determining whether the location of the signing event is indicative of an occurrence of an unsanctioned signing event; and
the one or more services that are configured to determine the set of credentials are configured to determine whether the location of the signing event indicates the occurrence of the unsanctioned signing event.

34. The system of any of clauses 27 to 33, wherein the one or more services are further configured to cause the at least one computing device to imprint the signature as an optically scannable code.

35. The system of any of clauses 27 to 34, wherein the one or more services that are configured to generate the signature are further configured to generate the signature further based at least in part on a confidence score indicating a likelihood that the signatory is signing under duress.

36. The system of any of clauses 27 to 35, wherein:
the set of credentials includes a set of biometric data about the signatory; and
the one or more services that are configured to determine the set of credentials are configured to determine, based at least in part on a set of criteria for determining whether the set of biometric data is indicative of an occurrence of an unsanctioned signing event, whether the set of biometric data indicates the occurrence of the unsanctioned signing event.

37. The system of any of clauses 27 to 36, wherein the set of biometric data includes physiological biometric data and behavioral biometric data, and the set of criteria includes criteria for determining whether a combination of the physiological biometric data and the behavioral biometric data is indicative of the occurrence of the unsanctioned signing event.

38. A non-transitory computer-readable storage medium having stored thereon executable instructions that, when executed by one or more processors of a computer system, cause the computer system to at least:
receive a signature of a signatory;
receive a document identifier for identifying a document;
obtain a token identifier for identifying an token, wherein the token is authorized by a service provider to generate signatures; and
determine, based at least in part on the signature, the document identifier, the token identifier, that the received signature is associated with an unsanctioned signing event.

39. The non-transitory computer-readable storage medium of clause 38, wherein the instructions that determine that the received signature is associated with an unsanctioned signing event include instructions that cause the computer system to determine, based at least in part on criteria limiting signing authority of the signatory, that the received signature is associated with a signing event that exceeded a signing authority of the signatory.

40. The non-transitory computer-readable storage medium of clause 38 or 39, wherein the instructions that cause the computer system to at least receive the signature, include instructions that cause the system to receive the signature the signatory by scanning an optically scannable code.

41. The non-transitory computer-readable storage medium of any of clauses 38 to 40, wherein the instructions further include instructions, when executed by the one or more processors, cause the computer system to, based at least in part on determining that the received signature is associated with the unsanctioned signing event, perform a different action from an action that would have been performed had the received signature been associated with a sanctioned signing event.

42. The non-transitory computer-readable storage medium of any of clauses 38 to 41, wherein the different action includes granting access to a different account than an account associated with the sanctioned signing event.

43. The non-transitory computer-readable storage medium of any of clauses 38 to 42, wherein the different action includes not revealing one or more items of an account, wherein the one or more items would be revealed had the received signature been associated with the sanctioned signing event.

44. The non-transitory computer-readable storage medium of any of clauses 38 to 43, wherein the different action includes a challenge-response action wherein a challenge is presented to the signatory to confirm that the unsanctioned signing event is sanctioned The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   under the control of one or more computer systems configured with executable instructions,
     receiving a signature of a signatory, wherein the signatory is associated with a first set of credential data and a second set of credential data, wherein the first set of credential data is associated with a first duress level, and wherein the second set of credential data is associated with a second duress level;
     receiving a document identifier for identifying a document, the document identifier derived based at least in part from document contents;
     obtaining an identity verification identifier for identifying an identity verification token, wherein the identity verification token is registered with an identity registrar and authorized by the identity registrar to generate signatures, and wherein the identity verification identifier comprises a first private key corresponding to a first public key and a second private key corresponding to a second public key;
     generating a first signature based at least in part on the document identifier, the first set of credential data, and the identity verification identifier, wherein the first signature is based at least in part on encrypting the document identifier using the first private key;
     determining that the generated first signature is not a match to the received signature of the signatory;
     generating a second signature based at least in part on the document identifier, the second set of credential data, and the identity verification identifier, wherein the second signature is based at least in part on encrypting the document identifier using the second private key;
     determining that the generated second signature is a match to the received signature of the signatory; and
     performing an action in accordance with the second duress level, wherein the action is one or more of hiding information associated with a first account, displaying information associated with a second account, notifying security personnel of a security incident indicated by the second duress level, sending a message indicating an occurrence of the second duress level, indicating the occurrence of the second duress level in a data store, or repudiating transactions associated with the document.

2. The computer-implemented method of claim 1, wherein the second set of credentials is associated with a signing event where the signatory signed the document unwillingly, and wherein determining that the generated second signature is a match to the received signature is an indication that the signatory signed the document unwillingly.

3. The computer-implemented method of claim 1, wherein the first set of credential data includes a first duress confidence score and the second set of credential data includes a second duress confidence score, wherein the second duress confidence score indicates a greater likelihood than the first duress confidence score of the signature having been made under duress.

4. A system, comprising:
   at least one computing device that implements one or more services, wherein the one or more services:

receive, from a signatory, a request to generate a signature for a document, wherein the signatory is associated with multiple sets of credentials, wherein a first set of credentials is associated with a first duress level, and wherein a second set of credentials is associated with a second duress level;

obtain a document identifier for the document, the document identifier derived based at least in part from document contents;

obtain a token identifier for the at least one computing device, wherein the token identifier is registered with an identity registrar and authorized by the identity registrar to generate signatures, and wherein the token identifier comprises a first private key corresponding to a first public key and a second private key corresponding to a second public key;

generate a first signature based at least in part on the document identifier, the first set of credentials, and the identity verification identifier, wherein the first signature is based at least in part on encrypting the document identifier using the first private key;

determine that the generated first signature is not a match to the received signature of the signatory;

generate a second signature based at least in part on the document identifier, the second set of credentials, and the identity verification identifier, wherein the second signature is based at least in part on encrypting the document identifier using the second private key;

determine that the generated second signature is a match to the received signature of the signatory; and perform an action in accordance with a duress level associated with the second set of credentials, wherein the action is one or more of hiding information associated with a first account, displaying information associated with a second account, notifying security personnel of a security incident indicated by the duress level, sending a message indicating an occurrence of the duress level, indicating the occurrence of the duress level in a data store, or repudiating transactions associated with the document.

5. The system of claim 4, wherein the one or more services further request, from the signatory, the credentials to use as part of the signature.

6. The system of claim 4, wherein:
the multiple sets of credentials include multiple sets of biometric data associated with the signatory;
at least one set of the multiple sets of biometric data includes one or more of fingerprint data or finger movement data that indicates an occurrence of a sanctioned signing event; and
at least another set of biometric data includes one or more of fingerprint data or finger movement data that indicates an occurrence of an unsanctioned signing event.

7. The system of claim 4, wherein the at least one computing device includes sensors capable of measuring one or more of:
a heart rate of the signatory,
an amount of pupil dilation of the signatory,
body temperature of the signatory,
an amount of sweat of the signatory, or
blood pressure of the signatory.

8. The system of claim 4, wherein:
the multiple sets of credentials include:
a location of a signing event corresponding to the signature; and a set of criteria for determining whether the location of the signing event is indicative of an occurrence of an unsanctioned signing event; and the one or more services that determine the multiple sets of credentials further determine whether the location of the signing event indicates the occurrence of the unsanctioned signing event.

9. The system of claim 4, wherein the one or more services are further configured to cause the at least one computing device to imprint the signature as an optically scannable code.

10. The system of claim 4, wherein the one or more services that generate the signature further generate the signature further based at least in part on a confidence score indicating a likelihood that the signatory is signing under duress.

11. The system of claim 4, wherein:
the multiple sets of credentials include a set of biometric data about the signatory; and
the one or more services that determine the multiple sets of credentials further determine, based at least in part on a set of criteria for determining whether the set of biometric data is indicative of an occurrence of an unsanctioned signing event, whether the set of biometric data indicates the occurrence of the unsanctioned signing event.

12. The system of claim 11, wherein the set of biometric data includes physiological biometric data and behavioral biometric data, and the set of criteria includes criteria for determining whether a combination of the physiological biometric data and the behavioral biometric data is indicative of the occurrence of the unsanctioned signing event.

13. The system of claim 4, wherein:
the request includes an indication of at least one acceptable type of credentials for signing the document;
one or more credentials of the multiple sets of credentials are of the at least one acceptable type; and
the signatory selects the credentials from the one or more credentials.

14. A non-transitory computer-readable storage medium having stored thereon executable instructions that, as a result of execution by one or more processors of a computer system, cause the computer system to at least:
receive a signature of a signatory, wherein the signatory is associated with a plurality of sets of credential data, wherein each set of credential data is associated with a corresponding duress level of a plurality of duress levels;
receive a document identifier for identifying a document, the document identifier derived based at least in part from document contents;
obtain a token identifier for identifying a token, wherein the token is authorized by a service provider to generate signatures and comprises a set of private keys of a public-private key scheme;
generate a first signature, using the token, wherein the signature is based at least in part on encrypting the document identifier using a first private key of the set of private keys;
determine, based at least in part on the signature, the document identifier, the token identifier, and a public key from a set of public keys corresponding to the set of private keys of the public-private key scheme;
determine that the generated first signature is not a match to the received signature of the signatory;
generate a second signature based at least in part on the document identifier, the second set of credential data, and the identity verification identifier, wherein the second signature is based at least in part on encrypting the document identifier using the second private key;

determine that the generated second signature is a match to the received signature of the signatory and that the signature received is associated with a duress level of the plurality of duress levels, wherein the duress level indicates an occurrence of an event that is:

a duress event, or a signing event that exceeded a signing authority of the signatory; and perform an action as a result of the event determined to have occurred.

15. The non-transitory computer-readable storage medium of claim 14, wherein the instructions include instructions that cause the computer system to determine that the signature received is associated with a signing event that exceeded a signing authority of the signatory based at least in part on criteria limiting signing authority of the signatory.

16. The non-transitory computer-readable storage medium of claim 14, wherein the instructions that cause the computer system to at least receive the signature include instructions that cause the system to receive the signature of the signatory by scanning an optically scannable code.

17. The non-transitory computer-readable storage medium of claim 14, wherein the instructions further include instructions that cause the computer system to, based at least in part on determining that the signature received is associated with the occurrence of the duress event, perform a different action from an action that would have been performed had the signature received been associated with an occurrence of a non-duress event.

18. The non-transitory computer-readable storage medium of claim 17, wherein the different action includes granting access to a different account than an account associated with the sanctioned signing event.

19. The non-transitory computer-readable storage medium of claim 17, wherein the different action includes not revealing one or more items of an account, wherein the one or more items would be revealed had the signature received been associated with the sanctioned signing event.

20. The non-transitory computer-readable storage medium of claim 17, wherein the different action includes a challenge-response action wherein a challenge is presented to the signatory to confirm that the duress event is actually occurring under duress.

* * * * *